(12) United States Patent
Cherrier et al.

(10) Patent No.: US 10,358,784 B1
(45) Date of Patent: Jul. 23, 2019

(54) SOIL MATRIX WATER TABLE CONTROL APPARATUS

(71) Applicant: Florida A&M University, Tallahassee, FL (US)

(72) Inventors: Jennifer Cherrier, Brooklyn, NY (US); Alejandro Bolques, Quincy, FL (US); Michael Abazinge, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 204 days.

(21) Appl. No.: 15/470,046

(22) Filed: Mar. 27, 2017

Related U.S. Application Data

(63) Continuation-in-part of application No. 14/172,457, filed on Feb. 4, 2014, now Pat. No. 9,605,397.

(60) Provisional application No. 61/748,226, filed on Feb. 4, 2013.

(51) Int. Cl.
*E02B 11/00* (2006.01)
*E02B 13/02* (2006.01)

(52) U.S. Cl.
CPC ............ *E02B 11/005* (2013.01); *E02B 13/02* (2013.01)

(58) Field of Classification Search
None
See application file for complete search history.

(56) References Cited

U.S. PATENT DOCUMENTS

| | | | |
|---|---|---|---|
| 5,533,303 A | 7/1996 | Harvey | |
| 6,467,994 B1 | 10/2002 | Ankeny et al. | |
| 6,569,321 B2 | 5/2003 | Coffman | |
| 7,232,278 B1 | 6/2007 | Danehy et al. | |
| 7,776,217 B2 | 8/2010 | Lucas | |
| 7,967,979 B2 | 6/2011 | Grewal et al. | |
| 8,048,303 B2 | 11/2011 | Lucas | |
| 2001/0045383 A1 | 11/2001 | Coffman | |
| 2008/0205987 A1 | 8/2008 | Furrer et al. | |
| 2009/0261036 A1 | 10/2009 | Lucas | |

FOREIGN PATENT DOCUMENTS

WO  2011097681 A1  8/2011

OTHER PUBLICATIONS

Dibble, S. E., Elements of Plumbing, McGraw-Hill Book Company, Inc., 1918, excerpt of p. 103.

*Primary Examiner* — Krishnan S Menon
*Assistant Examiner* — Bradley R Spies
(74) *Attorney, Agent, or Firm* — Javier M. Mixco; Nilay J. Choksi; Smith & Hopen, P.A.

(57) ABSTRACT

A vegetated or non-vegetated buffer water retention system. The current invention can be utilized for both smaller scaled (e.g., residential or commercial) purposes or larger scaled (e.g., agricultural, municipal, industrial) purposes. In certain embodiments, the system generally includes a perforated drainage pipe and an elevated overflow controller apparatus (e.g., T-shaped member, arched overflow valve apparatus) in open communication with each other. These components allow the system to control the soil matrix water table. With additional valves, pumps, and water reservoirs, the system can control both the soil matrix water table and stored water reuse. The systems can be used not only to enhance plant root uptake and microbial utilization of nutrients and pollutants in water, but also to capture and reuse water inflows, thereby aiding in flooding abatement, water conservation and preventing soil erosion.

10 Claims, 21 Drawing Sheets

Table 1. Example of contents that may be needed to control the soil matrix water table only in a smaller scaled environment (e.g., residential rain garden).

| Item # & image | Ref. # | Specification | Description |
|---|---|---|---|
| 1 | 12 | 10' long x 4"OD Female Threaded Perforated Drainage PVC Pipe or Corrugated Perforated Drainage Pipe | For plumbing to garden PVC underdrain system |
| 2 | 14 | 4"OD Male Threaded Tee Drainage PVC Pipe | For vertical and horizontal outflow direction |
| 3 | 16 | ½' long x 4"OD Female Threaded Drainage PVC Pipe<br>1' long x 4"OD Female Threaded Drainage PVC Pipe<br>1½' long x 4"OD Female Threaded Drainage PVC Pipe<br>2' long x 4"OD Female Threaded Drainage PVC Pipe | For selective vertical outflow adjustments |
| 4 | 18 | 1' long x 4"OD Female Threaded Drainage PVC Pipe | For horizontal outflow |
| 5 | 20 | 4"OD PVC Plug | For capping vertical or horizontal outflow |
| 10 | 22 | 20' x 50' x 3.5 Mil Plastic Sheeting Liner made from either recycled plastic, impermeable clay layer or sodium bentonite | For subsurface water retention (will cover an area of @ least 100 sq ft) |

Fig. 2A

Table 2. Example of contents that may be needed to control the soil matrix water table and manually control stored water reuse in a smaller scaled environment (e.g., residential rain garden).

| Item # & image | Ref. # | Specification | Description |
|---|---|---|---|
| 1 through 5 (option A) | 12-20 | See option A | See option A |
| 6 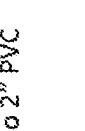 | 26 | 4"OD Female x 2"OD Male Threaded PVC Reducer | For reducing from 4" to 2" PVC |
| 7 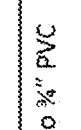 | 28 | 2"OD Male Threaded PVC Reducer x ¾"ID Threaded Bushing | For reducing from 2" to ¾" PVC |
| 8 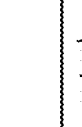 | 30 | ¾"OD Male PVC Valve | For horizontal outflow control |
| 9  | 32 | Outflow hose | For horizontal outflow hose-to-hose connection for immediate gravity fed reuse |
| 10 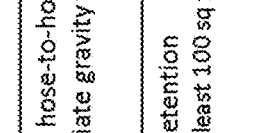 | 22 | 20' x 50' x 3.5 Mil Plastic Sheeting Liner made from either recycled plastic, impermeable clay layer or sodium bentonite | For subsurface water retention (will cover an area of @ least 100 sq ft) |

Fig. 3A

Table 3. Example of contents that may be needed for control of the soil matrix water table and automated control of stored water reuse in a smaller scaled environment (e.g., residential rain garden).

| Item # & image | Ref. # | Specification | Description |
|---|---|---|---|
| 1 through 3 (option A) | 12-16 | See option A | See option A |
| 4 | 36 | sensor | To activate automated pumping |
| 5 | 38 | Horizontal overflow pipe | For overflow into adjacent passive or activated vegetated buffer system |
| 6 | 40 | PVC plug | For capping horizontal outflow from undergarden drainage pipe |
| 7 | 42 | PVC pipe | For vertical outflow up through pumping system |
| 8 | 44 | Valve & Pump(s) system | for automated pumping, triggered by sensor |
| 9 | 46 | Outflow hose | For pump to water reservoir connection |
| 10 | 48 | above or below ground water reservoir w/ drip irrigation or sprinkler system | To store water pumped from system for later reuse |
| 12 | 22 | 20' x 50' x 3.5 Mil Plastic Sheeting Liner made from either recycled plastic, impermeable clay layer or sodium bentonite | For subsurface water retention (will cover an area of @ least 1000 sq ft) |

Fig. 4A

Table 4. Example of contents that may be needed for control of the soil matrix water table and manual control of stored water reuse in a larger scaled environment (e.g., commercial, industrial, municipal).

| Item # & image | Ref. # | Specification | Description |
|---|---|---|---|
|  | 12, 56 | Threaded perforated drainage PVC pipe or corrugated perforated drainage pipe, and associate connector | Inflow piping connection |
|  | 60, 64 | End posts at ends of arch | End posts connect to overflow piping |
|  | 52, 61 | Arched overflow piping with venting | For overflow into adjacent passive or activated vegetated buffer system |
|  | 58 | Piping leading to arch | Piping leading to arched overflow |
|  | 62 | Piping leading to system drain | Connects system inflow with system drain |
|  | 54 | Valve | for manual operation, in vertical position it's closed & water goes to overflow, in horizontal position it's open & vegetated buffer system drains |
|  | 66 | System drain for outflow of water | System drain, can be vertical or horizontal |

Fig. 6A

Table 5. Example of contents that may be needed for control of the soil matrix water table and automated

| Item # & image | Ref. # | Specification | Description |
|---|---|---|---|
| | 12, 56 | Threaded perforated drainage PVC pipe or corrugated perforated drainage pipe, and associate connector | Inflow piping connection |
| | 60, 64 | End posts at ends of arch | End posts connect to overflow piping |
| | 52, 61 | Arched overflow piping with venting | For overflow into adjacent passive or activated vegetated buffer system |
| | 58 | Piping leading to arch | Piping leading to arched overflow |
| | 62 | Piping leading to valve & pump system | Connects system inflow with system drain |
| | 54, 44 | Valve &Pump(s) system | for automated pumping, triggered by sensor |
| | 46 | Piping to reservoir | For pump to water reservoir connection |
| | 48 | Above or below ground water reservoir w/ drip irrigation or sprinkler system | To store water pumped from system for later reuse |
| | 36 | Sensor | To activate automated valve & pump system |

Fig. 7A

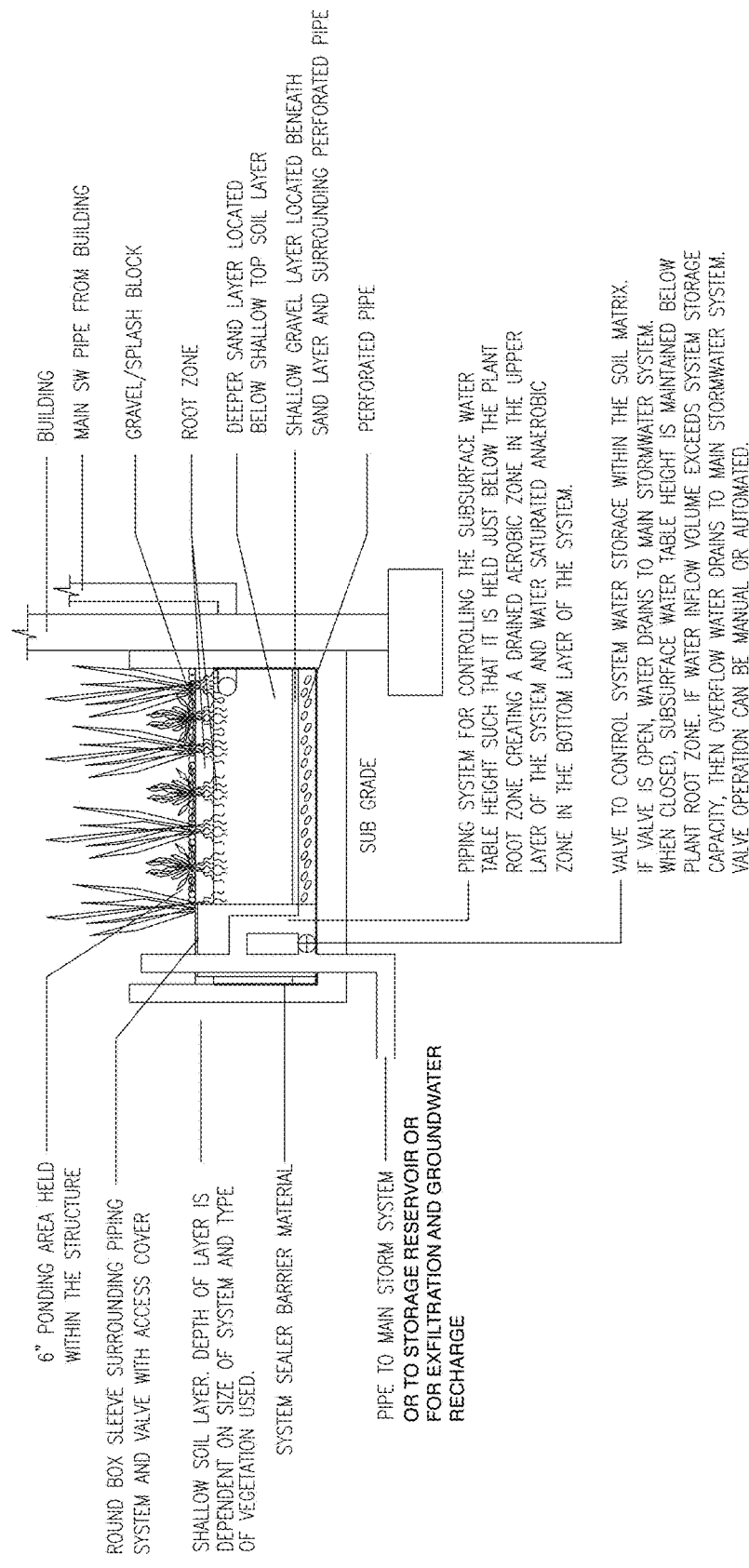

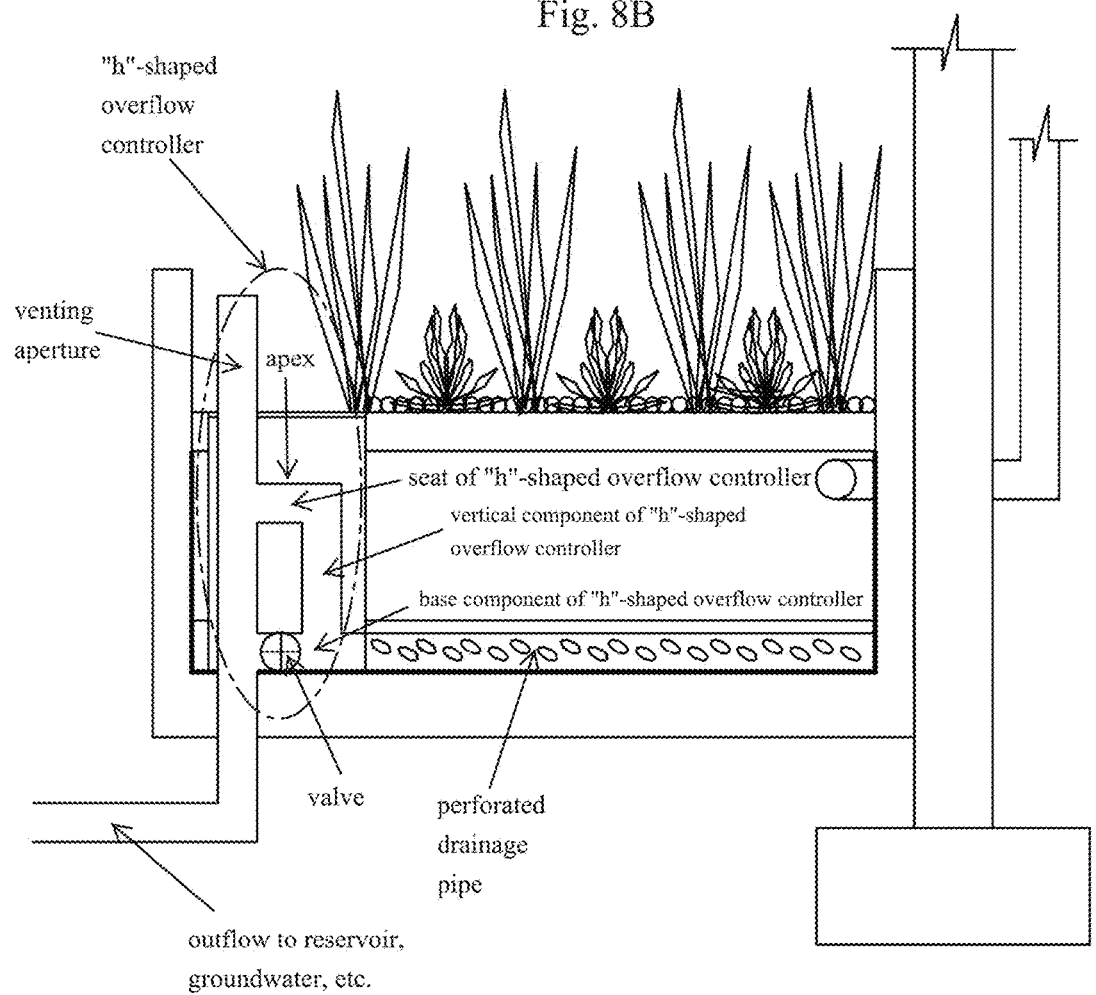

SOIL MATRIX WATER TABLE CONTROL APPARATUS

CROSS-REFERENCE TO RELATED APPLICATIONS

This nonprovisional application is a continuation-in-part of and claims priority to U.S. Nonprovisional patent application Ser. No. 14/172,457, entitled "Soil Matrix Water Table Control Apparatus", filed Feb. 4, 2014 by the same inventors, which claims priority to U.S. Provisional Application No. 61/748,226, entitled "Water Retention and Reuse System", filed Feb. 4, 2013 by the same inventors, both of which are incorporated herein by reference in their entireties.

BACKGROUND OF THE INVENTION

1. Field of the Invention

This invention relates, generally, to vegetated buffer systems. More particularly, it relates to an outflow plumbing device system that adjusts the water table inside these systems and controls the retention time and allows for water reuse, thus aiding in water conservation.

2. Description of the Prior Art

Vegetated buffer systems, typically used for smaller scaled residential and municipal purposes, are often referred to as 'rain gardens' or bioswales and are a plant based system used to manage stormwater runoff They are typically located in a low point or depression of the landscape designed to slow down and/or capture stormwater runoff. It is a low impact development, non-point pollution practice used to mitigate stormwater pollutants in runoff by directing surface flows to the vegetated buffer system. A vegetated buffer system with a similar function of nutrient and contaminant removal used in larger scaled applications, such as agriculture, municipalities and industry are often referred to as a bioretention cells, vegetated strips, or bioswales.

Plants and microbiota in these vegetated buffer systems are utilized to mitigate pollution in runoff by adsorbing dissolved nutrients, metals, pathogens, hydrocarbons, and other contaminants via plant root uptake and soil microbial activities. Key to the effectiveness and the consistency of vegetated buffer system's contaminant removal is a) water retention time and adjustment of the garden water table height in the system to allow for plant root uptake and microbial utilization and b) soil composition.

Accordingly, what is needed is a more effective system and method for controlling water retention time, adjusting water tables and allowing for the reuse of the water captured by the vegetated buffer system. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas including water retention and reuse of "green roofs". Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved, more effective outflow plumbing device is now met by a new, useful and nonobvious invention.

In an embodiment, the current invention is a system for controlling a soil matrix water table in a vegetated or non-vegetated buffer area. The system generally includes a perforated drainage pipe and an elevated overflow controller. The perforated drainage pipe is positioned substantially horizontally underground beneath a root zone in the bioretention area. The overflow controller is directly or indirectly coupled to perforated drainage pipe and is raised above the perforated pipe, such that it sets the water table at a level higher than a level of the perforated pipe. Additionally, the overflow controller is positioned substantially beneath the root zone or within an area adjacent to the root zone. The system may optionally include a subsurface enclosure (e.g., round box sleeve) that encloses the overflow controller. Additionally, a liner may be disposed in underlying relation to the perforated drainage pipe, or alternatively, the liner can be disposed in underlying relation to the entire system.

Structurally, the overflow controller itself includes a vertical component that forms an apex of the overflow controller, and a base component positioned beneath the vertical component and beneath the apex of the controller. The base component includes a valve therein, such that when the valve is open, water flows through the base component and not through the vertical component. The apex of the overflow controller sets the height of the water table when then valve is closed and water is flowing through the vertical component to the apex. In this configuration, with the perforated pipe and overflow controller in open communication with each other, water follows a path of travel from the root zone, into the interior of the perforated pipe through the perforations, and into the interior of the overflow controller.

If the overflow controller is indirectly coupled to the perforated drainage pipe, a solid drainage pipe can be secured to the perforated drainage pipe substantially underneath the soil berm or other divisional between the vegetated buffer area and the neighboring area. In this case, the overflow controller would be coupled to the opposite end of the solid drainage pipe. The respective interiors of the perforated drainage pipe, solid drainage pipe, and overflow controller are in open communication with each other.

If the overflow controller is an h-shaped member, the h-shaped member would include the vertical component and a seat, where the seat forms the apex of the overflow controller. Further, a venting aperture or piping can be disposed on or extend from the apex of the overflow controller. Alternatively or in addition, a sensor (e.g., float switch, timer, etc.) can be equipped on the seat, and a pump can be disposed in electrical communication with the sensor, such that when the sensor is triggered, the pump is activated. An outflow hose would be disposed in communication with the h-shaped member, such that when the pump is activated, water is pumped by the pump from the h-shaped member into the outflow hose. Further, a water reservoir may be coupled to the outflow hose for storing the water that is pumped through the outflow hose.

If the overflow controller is the arched overflow valve apparatus, the arched overflow valve apparatus includes the base piping, a vertically-oriented arch (i.e., the vertical component), a shut-off valve (i.e., the previously-described valve), and a system drain. The base/horizontally-oriented piping forms the diameter of the arch and is open communication with the arch. When the shut-off valve is in a closed position, water follows a path of travel from the perforated drainage pipe into the arched overflow valve apparatus and into the system drain when water accumulates in the arch beyond the apex of the arch. When the shut-off valve is in an open position, the perforated drainage pipe is in open communication with the system drain so water follows a path of travel from the perforated drainage pipe into the system drain. In this configuration, the apex of the arch sets the height of the water table, and the height can be adjusted by tilting the arch. Optionally, the base/horizontally-oriented piping may be disposed in open communication with the perforated drainage pipe and in substantially perpendicular relation to the perforated drainage pipe. The shut-off valve would be positioned along the base/horizontally-oriented piping. It can be appreciated that the arched overflow valve apparatus operated system can be manually-operated or automated as with the T-shaped member operated system. In another embodiment, a venting aperture can be disposed in the apex of the arch to facilitate flow of the water through the arch. In yet another embodiment, the system can include end posts at each coupling point between the base/horizontally-oriented piping and the arch.

In certain embodiments, the system may include a sensor (e.g., float switch) equipped on the vertical component and in communication with the valve for automating opening and closing of the valve. When the sensor is triggered, the valve is opened for water to exit the overflow controller through the base component. In a further embodiment, the system includes a water reservoir coupled to the base component for storing water that flows through the base component.

In a separate embodiment, the current invention is a system for controlling the height of a soil matrix water table in a bioretention area, where the system can include any one or more—or even all—of the foregoing structural and functional characteristics.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 2A is a table of content included in an embodiment of a vegetated buffer system used to control a soil matrix water table with an overflow controller being a T-shaped member.

FIG. 3A is a table of content included in an embodiment of a vegetated buffer system used to control a soil matrix water table (with an overflow controller being a T-shaped member) and manually-operated water reuse storage.

FIG. 4A is a table of content included in an embodiment of a vegetated buffer system used to control a soil matrix water table (with an overflow controller being a T-shaped member) and fully automated water storage, reuse with irrigation (drip or sprinkler).

FIG. 6A is a table of content included in an embodiment of a vegetated buffer system used to control a soil matrix water table (with an overflow controller being an arched overflow valve apparatus) and manually-operated water reuse storage.

FIG. 7A is a table of content included in an embodiment of a vegetated buffer system used to control a soil matrix water table (with an overflow controller being an arched overflow valve apparatus) and fully automated water storage, reuse with irrigation (drip or sprinkler).

FIG. 8A is a schematic of an alternative embodiment of the vegetated buffer system of FIGS. 6A-6B and 7A-7B.

FIG. 8B depicts the embodiment of FIG. 8A with different components denoted for clarity.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Certain embodiments of the current invention include a smaller scaled vegetated buffer retention system for residential, municipal and commercial business stormwater and irrigation runoff use. Certain embodiments of the current invention include a larger scaled, vegetated buffer retention system for agricultural, municipal, and industrial runoff uses. Each system can be used for multiple purposes, for example to enhance plant root uptake and microbial utilization of nutrients and pollutants in water, and also to capture and reuse water inflows (surface water and subsurface water), thereby aiding in water conservation. It is contemplated that depending on the embodiment of the invention utilized, the current invention can accomplish the foregoing purposes individually or in combination. Further, the current invention can be utilized with other applications where it is desired to redirect, store, and/or reuse excess water above ground or underground. An above-ground example can be a green roof.

Figure 5:
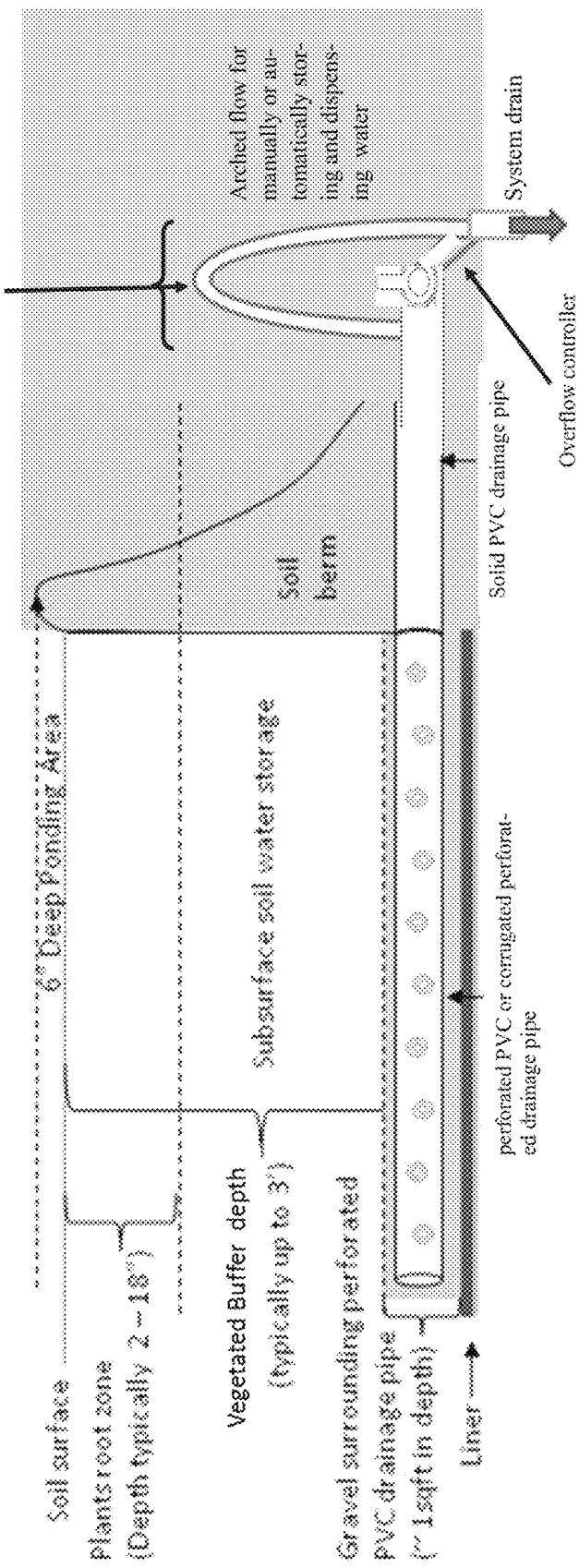
FIG. 5 is a schematic of a scalable embodiment of a vegetated buffer system with overflow controller being an arched overflow valve apparatus.

In a water retention system with a clearly defined plumbed outflow, the soil matrix water table can be managed in vegetated buffer systems by lining the base of the garden or system with a sheeting formed from any suitable material (e.g., recycled plastics), by lining the garden or system with an impermeable clay layer, or by using a sodium bentonite sealant. Subsequently, the drainage pipe outflow or discharge can be outfitted with an overflow controller, such as T-shaped member (e.g., formed of any suitable material, such as polyvinyl chloride, inert durable materials) (FIG. 1) or an arched overflow valve apparatus (FIG. 5) that can be pivoted (or tilted), so that the user can adjust the vegetated buffer system for varying plant root depths. The sheeting, clay layer, and/or bentonite sealant aids in water retention, and the T-shaped member or arched overflow valve apparatus aids in controlling the outflow of water vertically and/or horizontally.

The desired system soil composition can be attained by filling the vegetated buffer system with a sand filtration media (e.g., ASTM C-33 sand) which can then be augmented by either indigenous soil substrate, clays, or biochar, or blends of the three, depending on runoff related contaminants being targeted for removal, to attain a loam soil type (~40% sand, ~40% silt, ~20% clay plus organics).

In addition to addressing contaminant loading associated with surface flows, an advantage of the current invention is to mitigate contaminant loading associated with subsurface flows (e.g., leaky septic systems, septic system drain fields) or "surficial groundwater flows".

Figure 1:
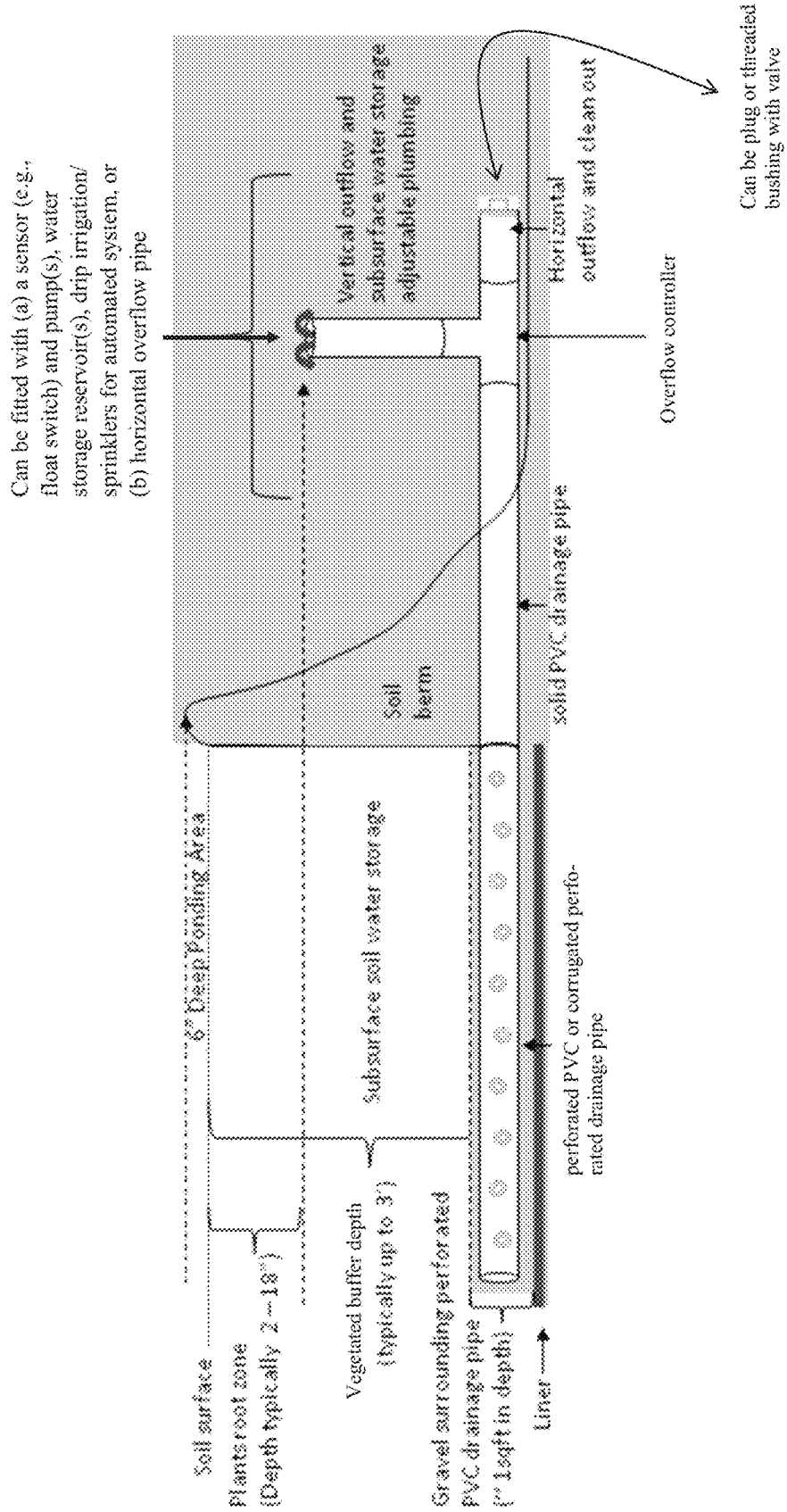
FIG. 1 is a schematic of a scalable embodiment of a vegetated buffer system with overflow controller being a T-shaped member.

Generally, as seen in FIG. 1, an embodiment of the current invention can function and be structured as follows. An environment or rain garden can be given with the following characteristics: a given soil surface, a ponding area with six (6)-inch depth above the soil surface, a plant root zone with a depth of about two (2) inches to about eighteen (18) inches below the soil surface, a garden depth of about three (3) feet, a subsurface soil water storage including and/or beneath the plants root zone, and a soil berm with an apex at or above the ponding area.

Given this environment, a liner or sealant would be positioned beneath the subsurface soil water storage in the bioretention area. The liner can be disposed horizontally within the bioretention area only (i.e., under the perforated drainage pipe), as seen in FIG. 1, or can be disposed across the entirety of the vegetated buffer system, as seen in FIGS. 2B, 3B, 4B, and 4C.

A perforated drainage pipe, which optionally can be corrugated as well, is horizontally positioned in overlying relation to the liner. The perforated drainage pipe would be positioned in underlying relation to the subsurface soil water storage and thus can terminate at the soil berm or other division between the bioretention area and a neighboring area, as seen in FIG. 1. The perforated drainage pipe can optionally be surrounded by gravel to facilitate filtering of the water into the perforated drainage pipe. At this point, the perforated drainage pipe is coupled to a horizontally-oriented solid drainage pipe, as seen in FIG. 1, or to an overflow controller (e.g., T-shaped member as in FIGS. 1, 2B, 3B, 4B, and 4C; or overflow valve apparatus as in FIGS. 5, 6B, 6C, and 7B). The solid drainage pipe is optional but if present, typically would traverse the soil berm out of the interior of the bioretention area and into the neighboring area. If present, the solid drainage pipe would be coupled to the overflow controller. Thus, the perforated drainage pipe can be directly or indirectly coupled to the overflow controller.

Still referring to FIG. 1, the overflow controller typically is positioned on the opposite side of the soil berm from the perforated drainage pipe. In other words, the perforated drainage pipe would be within the spatial confines of the bioretention area itself, and the overflow controller would be outside of the spatial confines of the bioretention area. The overflow controller structurally includes mechanisms for both vertical outflow and horizontal outflow. Vertical outflow can include subsurface water storage and adjustable plumbing. Horizontal outflow can include clean out. Structurally, the vertical outflow can be fitted with a flow switch and pump, water storage reservoir, drip irrigation/sprinklers (for automated system), and/or additional horizontal overflow piping. This will become more apparent as this specification continues. The horizontal outflow can include a plug and/or threaded bushing with valve. This will also become more apparent as this specification continues.

Various components of the vegetated buffer retention system can be formed of any suitable material, depending on needs of the user. Examples include, but are not limited to, polyvinyl chloride, concrete, steel, galvanized iron, copper, clay, chlorine-free plastics (e.g., high-density polyethylene, polypropylene, polyisobutylene), silicone, polyurethane, and other inert durable materials.

Vertical Control

To the vertical opening of the overflow controller, plumbing or piping can be used to create a height adjustable vertical rise/outflow that can be any length, for example about 6", 12", 18" or 24", depending on the depth of the drainage pipe. The height of the vertical outflow depends on the root depth of the planted garden, which is typically between about 12" and 18".

The outflow vertical rise governs the height of the water table accumulated in the subsurface of the bioretention area while preventing plant water-logging or wet-feet conditions. The general idea is that water can be stored in the subsurface of the garden just below the plant root zone while avoiding inundating conditions.

Horizontal Control

To the horizontal flow of the overflow controller, plumbing or piping can be used to reduce the underdrain opening. A horizontal end of the overflow controller can also be fitted with a plug or threaded bushing. The plug prevents water from exiting the system. Water can remain in the system until released into the vertical rise and ultimately the plant root zone.

If the horizontal end of the overflow controller is fitted with threaded bushing, rather than the plug, a valve can be installed at the threaded bushing to control the flow of water leaving the subsurface of the garden. Threaded bushing provides the user with the ability not only to control watering of the plant roots but also to store water by redirecting the subsurface outflow to an above ground storage vessel (e.g., rain barrel) or other subsurface water storage or usage devices.

The plumbing or piping used in the present invention can include any suitable material, including polyvinyl chloride, concrete, steel, galvanized iron, copper, clay, plastics, resin, rubber, and other polymers, among other materials that can allow the flow of water underground.

Example 1

Figure 2B:
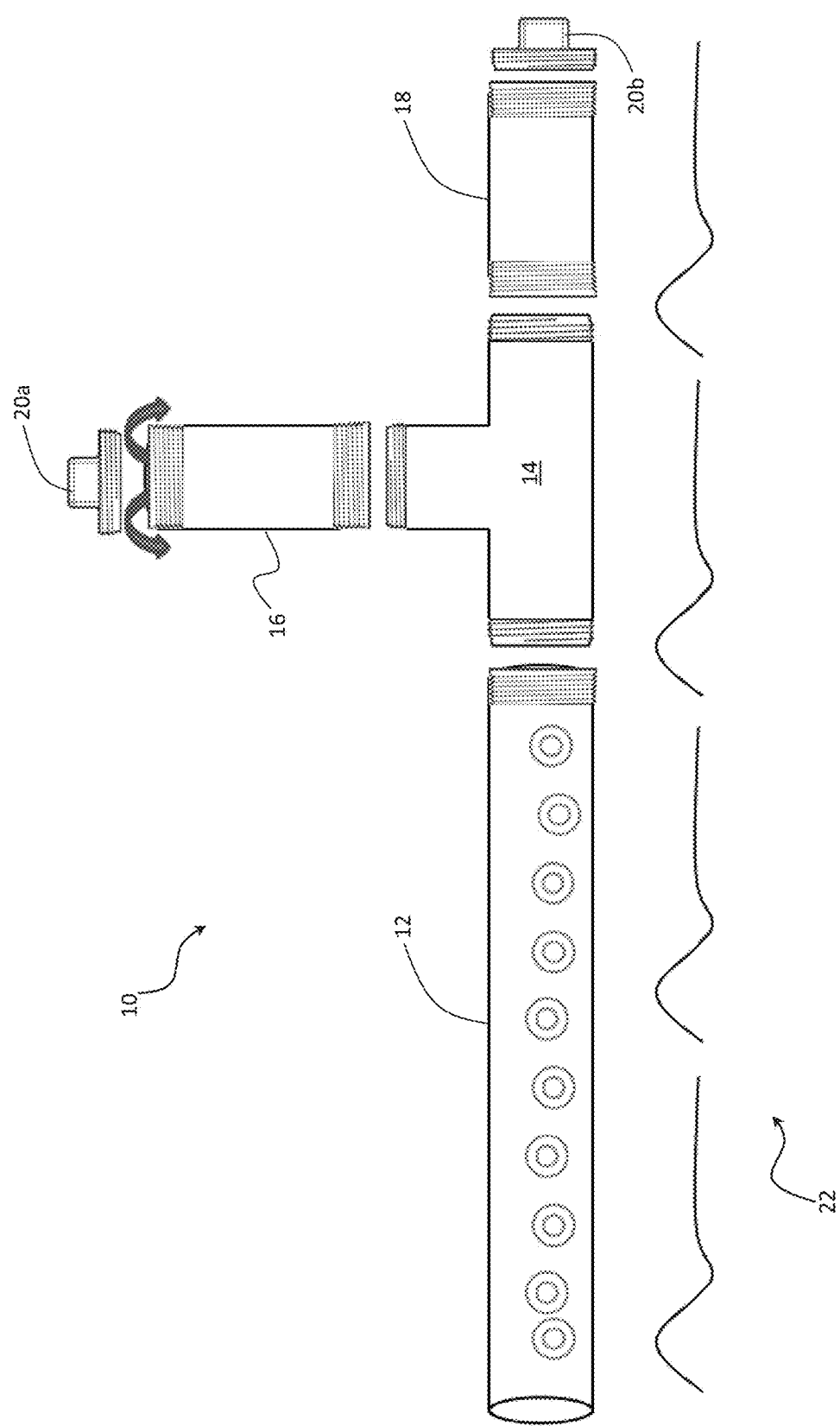
FIG. 2B is a schematic of an embodiment of a vegetated buffer system (with T-shaped member) including vertical flow discharge with horizontal cleanout, where the system is used to control a soil matrix water table.

FIG. 2A is a table showing an example of the content that may be needed to assemble an embodiment of a vegetated buffer retention system, generally denoted by the reference numeral 10, when a user desires to control only the soil matrix water table. FIG. 2B depicts an implementation of the content in a smaller scaled (e.g., residential) rain garden. A substantially similar implementation can be achieved for larger scaled (e.g., agricultural, municipal, industrial) vegetated buffer retention systems as well, as will be discussed further. The height of vertical outflow 16 can be adjustable and thus depends on the desired depth of drainage plumbing and the root depth of the planted garden. The height of adjustable vertical outflow 16 ultimately determines the level of the water table.

System 10 can be assembled by securing perforated drainage pipe 12, having a distal end further from the rain garden and a proximal end closer to the rain garden, to an optional solid drainage pipe (not shown in this figure but seen in FIG. 1) in a substantially horizontal position underground at the desired depth, as discussed previously. Liner 22 would be disposed under perforated drainage pipe 12 or under system 10 as a whole. Angle of position of system 10 underground can be altered as suitable for the user to accommodate different root depths and determine the level of the water table.

Overflow controller (here, T-shaped member) 14 is secured to the proximal end of perforated drainage pipe 12 (or, if the optional solid drainage pipe is present, to the proximal end of the optional solid drainage pipe). T-shaped member 14 has a first horizontal end, a second horizontal end, and a vertical end. The proximal end of perforated drainage pipe 12 is coupled to the first horizontal end of T-shaped member 14.

For a manually-operated system for controlling the soil matrix water table only, as seen in FIG. 2B, vertical outflow 16, having a lower end and an upper end, is secured to the vertical end of T-shaped member 14 via the lower end up vertical outflow 16. Plug 20a or a valve (as will be seen in subsequent figures) can be secured to the upper end of vertical outflow 16, depending on the needs of the user. Optional horizontal outflow 18, having a first end and a second end, is secured to the second horizontal end of T-shaped member 14 via the first end of horizontal outflow 18. Plug 20b is secured to the second end of optional horizontal outflow 18 (or, if no horizontal outflow 18 is present, to the second horizontal end of T-shaped member 14) to prevent water from exiting system 10.

Figure 3B:
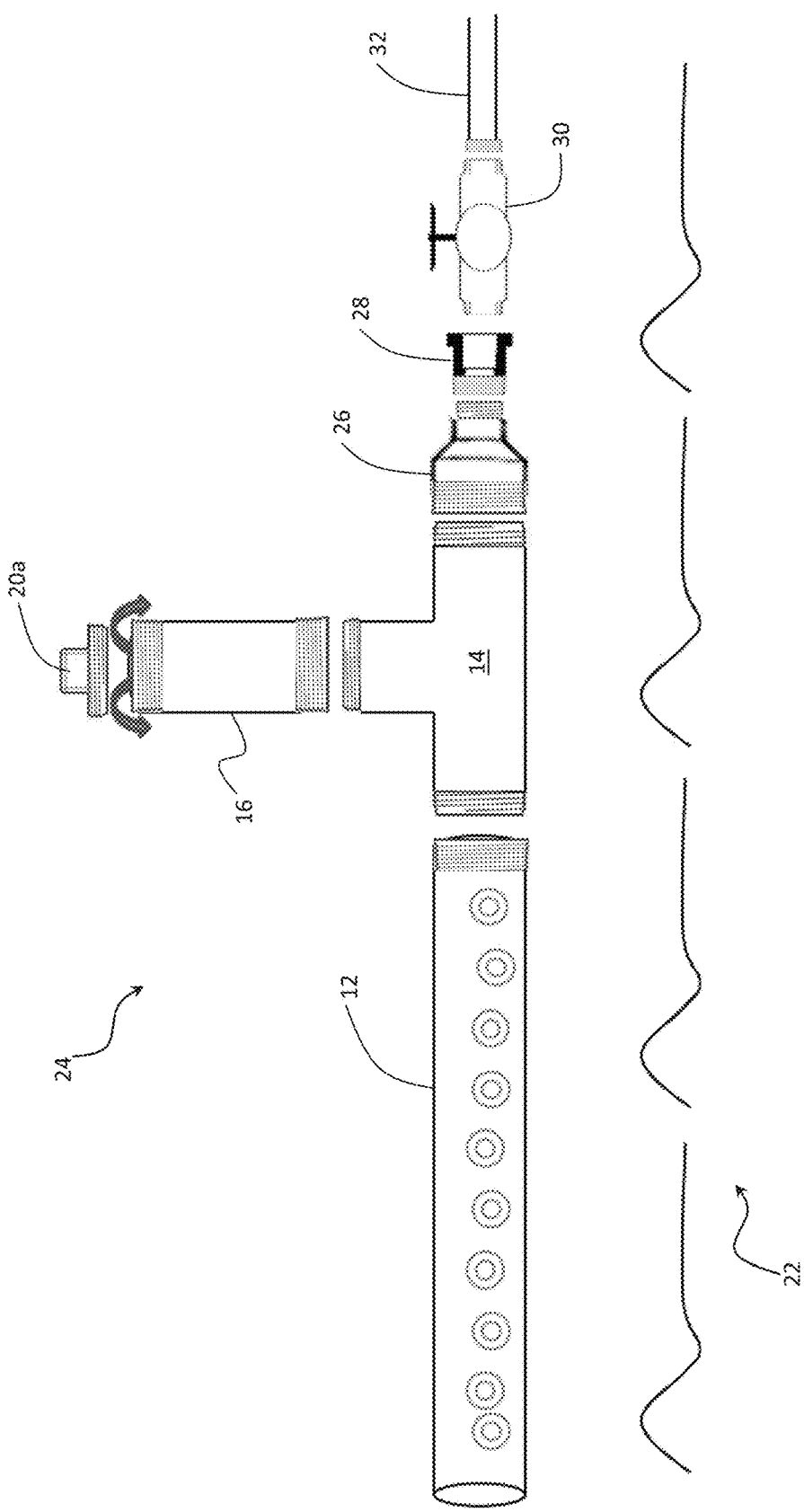
FIG. 3B is a schematic of an embodiment of a vegetated buffer system including vertical flow discharge with horizontal cleanout, where the system is used to manually control a soil matrix water table (with an overflow controller being a T-shaped member) and stored water reuse.

Alternatively, for a manually operating both the water table and water storage and reuse, as seen in FIG. 3B, in lieu of plug 20b (or if optional horizontal outflow 18 is present, then possibly in lieu of both horizontal outflow 18 and plug 20b), threaded bushing 28, valve 30, and outflow hose 32 can be added to the second horizontal end of T-shaped member 14. This will become clearer as this specification continues.

Figure 4B:
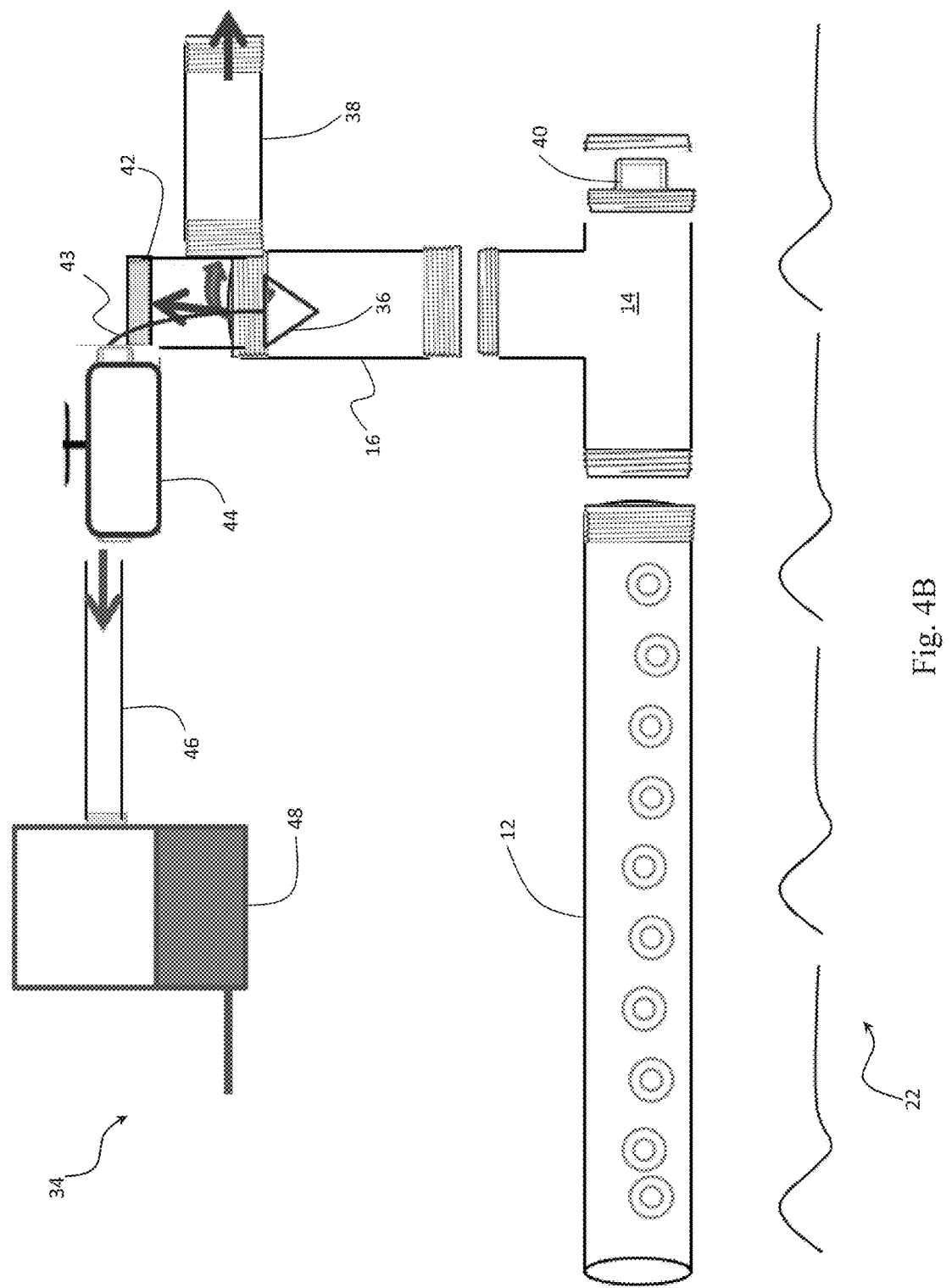
FIG. 4B is a schematic of an embodiment of a vegetated buffer system including vertical flow discharge with horizontal cleanout, where the system is used for fully automated control of a soil matrix water table (with an overflow controller being a T-shaped member) and automated water storage.
Figure 4C:
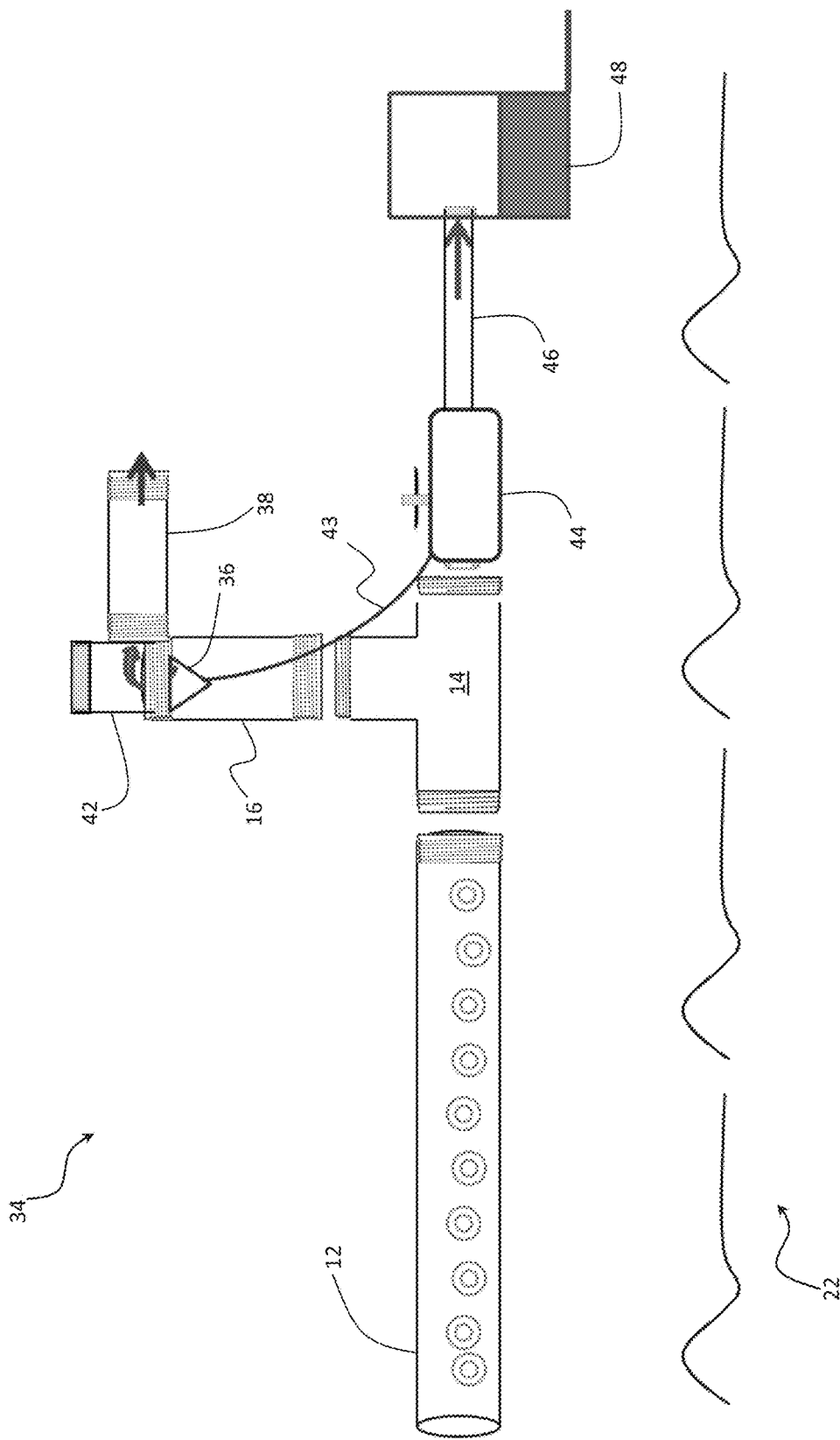
FIG. 4C is an alternative embodiment of FIG. 4B, where the pump and horizontal outflow hose are coupled to the overflow controller (i.e., T-shaped member).

Alternatively, for an automated system for controlling the water table and water storage and reuse, as seen in FIGS. 4B and 4C, in lieu of plug 20a, outflow hose 46 can pump into either an above ground or below ground storage reservoir 48, where vertical outflow 16 and 42 that are secured at the vertical end of T-shaped member 14 can be equipped with sensor (e.g. float switch, soil moisture sensor, or timer) 36 and valve/pump(s) system 44 to facilitate this process. This will also become more apparent as this specification continues.

Alternatively, horizontal outflow 18 can be secured at the second horizontal end of T-shaped member 14 for overflow into an adjacent active or passive garden system (not shown).

Example 2

FIG. 3A is a table showing an example of the content that may be needed to assemble an embodiment of a vegetated buffer retention system, generally denoted by the reference numeral 24, when a user desires to manually control both the soil matrix water table and stored water reuse. FIG. 2B depicts an implementation of the content in a smaller scaled (e.g., residential) rain garden. A substantially similar implementation can be achieved for larger scaled (e.g., agricultural, municipal, industrial) vegetated buffer retention systems as well, as will be discussed further. The height of vertical outflow 16 can be adjustable and thus depends on the desired depth of drainage plumbing and the root depth of the planted garden. The height of adjustable vertical outflow 16 ultimately determines the level of the water table.

System 24 can be assembled by securing perforated drainage pipe 12, having a distal end further from the rain garden and a proximal end closer to the rain garden, to an optional solid drainage pipe (not shown in this figure but seen in FIG. 1) in a substantially horizontal position underground at the desired depth, as discussed previously. Liner 22 would be disposed under perforated drainage pipe 12 or under system 24 as a whole. Angle of position of system 24 underground can be altered as suitable for the user to accommodate different root depths and determine the level of the water table.

Overflow controller (here, T-shaped member) 14 is secured to the opposite end of the optional solid drainage pipe (or, if the optional solid drainage pipe is present, to the proximal end of the optional solid drainage pipe). T-shaped member 14 has a first horizontal end, a second horizontal end, and a vertical end. The proximal end of perforated drainage pipe 12 is coupled to the first horizontal end of T-shaped member 14.

For a manually-operated system for controlling the soil matrix water table and the stored water reuse, as seen in FIG. 3B, vertical outflow 16, having a lower end and an upper end, is secured to the vertical end of T-shaped member 14 via the lower end up vertical outflow 16. Plug 20a or a valve (as will be seen in subsequent figures) can be secured to the upper end of vertical outflow 16, depending on the needs of the user.

Optional horizontal outflow 18, having a first end and a second end, may be coupled to the second horizontal end of T-shaped member 14 via the first end of horizontal outflow 18. Threaded bushing 28 is coupled to the second end of optional horizontal outflow 18 or, if no if no horizontal outflow 18 is present, directly to the second horizontal end of T-shaped member 14. Thus, threaded bushing 28 can be coupled directly or indirectly to T-shaped member 14. Valve 30 can also be coupled on threaded bushing 28 to manually control inflow or outflow of water by opening and closing valve 30 appropriately, as desired by the user. Hose or other drainage pipe 32 can be secured to the valve for water supply. If necessary, threaded reducer 26 can be used to couple differently-sized components, for example between T-shaped member 14 and threaded bushing 28, as seen in FIG. 3B.

Alternatively, for an automated system for controlling the water table and water storage and reuse, as seen in FIGS. 4B and 4C, in lieu of plug 20a, outflow hose 46 can pump into either an above ground or below ground storage reservoir 48, where vertical outflow 16 and 42 that are secured at the vertical end of T-shaped member 14 can be equipped with sensor 36 and valve/pump(s) system 44 to facilitate this process. This will also become more apparent as this specification continues.

Alternatively, horizontal outflow 18 can be secured at the second horizontal end of T-shaped member 14 for overflow into an adjacent active or passive garden system (not shown).

Example 3

FIG. 4A is a table showing an example of the content that may be needed to assemble an embodiment of a vegetated buffer retention system, generally denoted by the reference numeral 34, when a user desires to control both the soil matrix water table and stored water reuse. FIG. 4B depicts an implementation of the content in a smaller scaled (e.g., residential) rain garden. A substantially similar implementation can be achieved for larger scaled (e.g., agricultural, municipal, industrial) vegetated buffer systems as well, as will be discussed further. The height of vertical outflow 16 can be adjustable and thus depends on the desired depth of drainage plumbing and the root depth of the planted garden. The height of adjustable vertical outflow 16 ultimately determines the level of the water table.

System 34 can be assembled by securing perforated drainage pipe 12, having a distal end further from the rain garden and a proximal end closer to the rain garden, to an optional solid drainage pipe (not shown in this figure but seen in FIG. 1) in a substantially horizontal position underground at the desired depth, as discussed previously. Liner 22 would be disposed under perforated drainage pipe 12 or under system 34 as a whole. Angle of position of system 34 underground can be altered as suitable for the user to accommodate different root depths and determine the level of the water table.

Overflow controller (here, T-shaped member) 14 is secured to the proximal end of perforated drainage pipe 12 (or, if the optional solid drainage pipe is present, to the proximal end of the optional solid drainage pipe). T-shaped member 14 has a first horizontal end, a second horizontal end, and a vertical end. The proximal end of perforated drainage pipe 12 is coupled to the first horizontal end of T-shaped member 14.

The vertical end of T-shaped member 14 is equipped with an automated system for outflow pumping into an above ground or below ground water storage device 48 for subsequent reuse. Vertical outflow 16 is attached to the vertical end of T-shaped member 14 and is equipped with sensor 36 and valve/pump(s) system 44 electrically coupled 43 together.

Sensor 36 is triggered when the water height in the garden system or specifically vertical outflow 16 reaches a threshold level. Sensor 36 detects the rising level of liquid and automatically activates or energizes pump 44 to pump the water from vertical outflows 16 and 42 into storage reservoir 48 for subsequent reuse. Sensor 44 can be any suitable sensor as known in the art to detect a liquid and activate/energize a pump. Pump 44 can be any suitable pump as known in the art, for example including, but not limited to, sump pumps and condensate pumps.

Though a float switch is utilized in particular embodiments as described herein, system 34 can be automated through different mechanisms depending on the application. For example, if system 34 were to be used in a vegetated buffer system, system 34 could be automated with float switch 34 or a timer. As another example, if system 34 were to be used as an overflow plumbing device for a green roof, the automation of system 34 could be triggered by a soil moisture probe. System 34 can be automated in any way known in the art, depending on application.

Storage reservoir 48 can be positioned above ground or below ground. Storage reservoir 48 may also be equipped with an additional pump (not shown) for drip or sprinkler irrigation.

Plug 40 can be positioned on the second horizontal end of T-shaped member 14, thus directing all liquid vertically into the automated mechanism. Alternatively, horizontal outflow (not shown in this figure, shown by reference numeral 18 in FIG. 1) can be secured to the second horizontal end of T-shaped member 14 for overflow into an adjacent active or passive garden system. Alternatively or in addition, horizontal outflow 38 can be positioned in controlled communication with vertical outflows 16 and 42, such that when sensor 36 detects a rising level of liquid, pump 44 can drive the liquid into storage reservoir 48 and through horizontal outflow 38 for overflow into an adjacent reservoir or into an adjacent active or passive garden system. One of ordinary skill in the art could implement a pump and float switch of this nature that can accomplish this mechanism.

In an alternative embodiment, seen in FIG. 4C, pump and valve system 44 can be directly or indirectly coupled to the second horizontal end of T-shaped member 14. When sensor 36 (e.g., float switch, soil moisture) detects a threshold level of water traveling up vertical outflow 16, sensor 36 triggers valve and pump system 44 to direct water through the first and second horizontal ends of T-shaped member 14 and through outflow hose 46 into storage reservoir 48.

Example 4

Figure 6B:
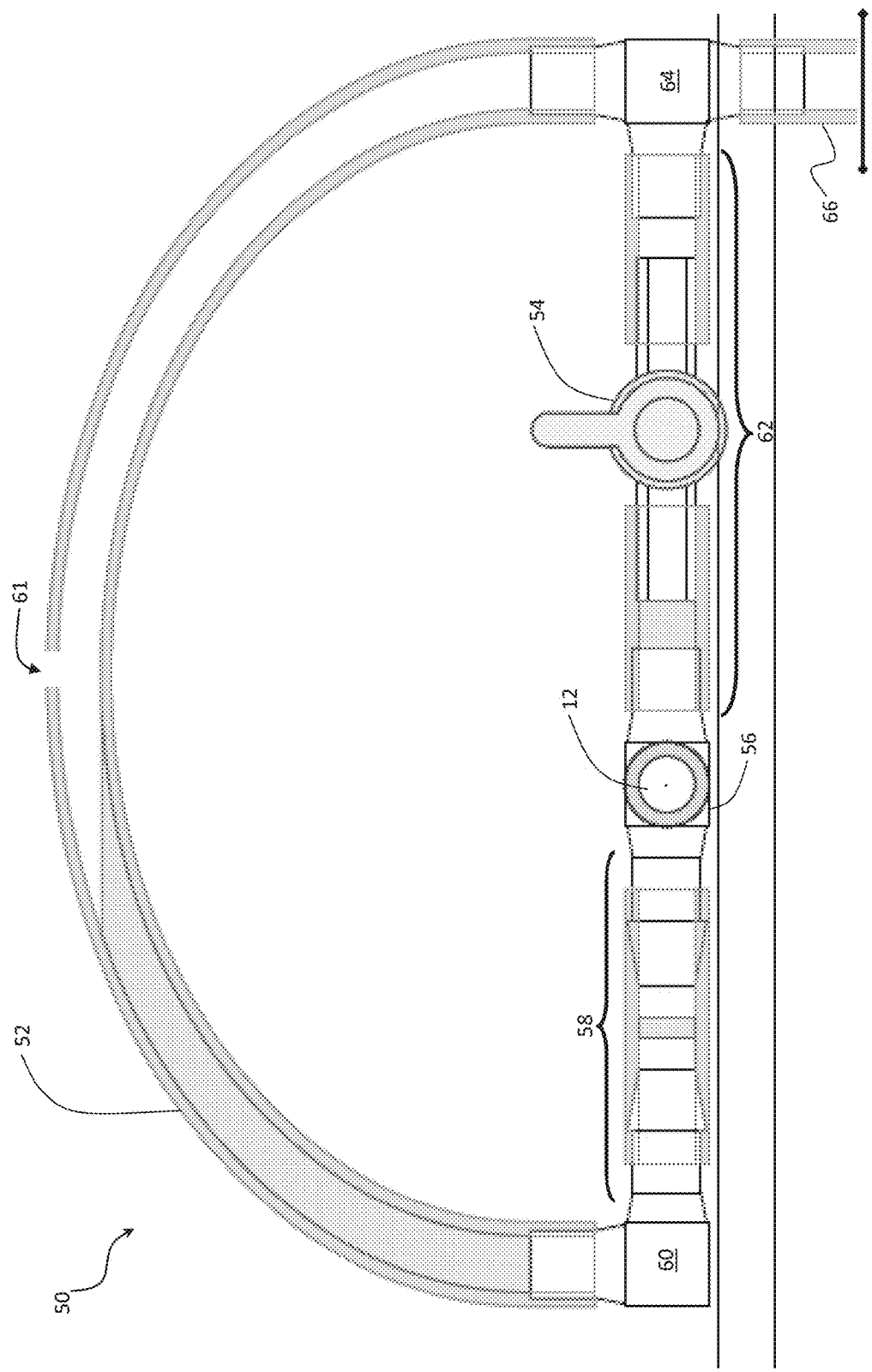
FIG. 6B is a schematic of a manually operated arched overflow valve apparatus used as an overflow controller according to an embodiment of the current invention, where the valve apparatus is in a closed state.

FIG. 6A is a table showing an example of the content that may be needed to assemble an embodiment of a vegetated buffer retention system, generally denoted by the reference numeral 49, when a user desires to control both the soil matrix water table and stored water reuse. FIG. 6B depicts an implementation of the content in a smaller scaled (e.g., residential) rain garden. A substantially similar implementation can be achieved for larger scaled (e.g., agricultural, municipal, industrial) vegetated buffer systems as well, as will be discussed further. The height of arch 52 can be adjustable by tilting the overflow controller, generally denoted by the reference numeral 50. The apex of arch 52 thus determines the level of the water table.

System 49 can be assembled by securing perforated drainage pipe 12, having a distal end further from the rain garden and a proximal end closer to the rain garden, to an optional solid drainage pipe (not shown in this figure but seen in FIG. 1) in a substantially horizontal position underground at the desired depth, as discussed previously. Liner (not seen in this figure) may be disposed under perforated drainage pipe 12 or under system 49 as a whole. Angle of position of overflow controller 50 underground can be altered as suitable for the user to accommodate different root depths and determine the level of the water table.

Overflow controller (here, arched overflow valve apparatus) 50 is secured to the proximal end of perforated drainage pipe 12 (or, if the optional solid drainage pipe is present, to the proximal end of the optional solid drainage pipe). Arched overflow valve apparatus 50 generally includes arch 52 and shut-off valve 54, along with the appropriate piping and connectors to secure arched overflow valve apparatus 50 to perforated drainage pipe 12.

Figure 6C:
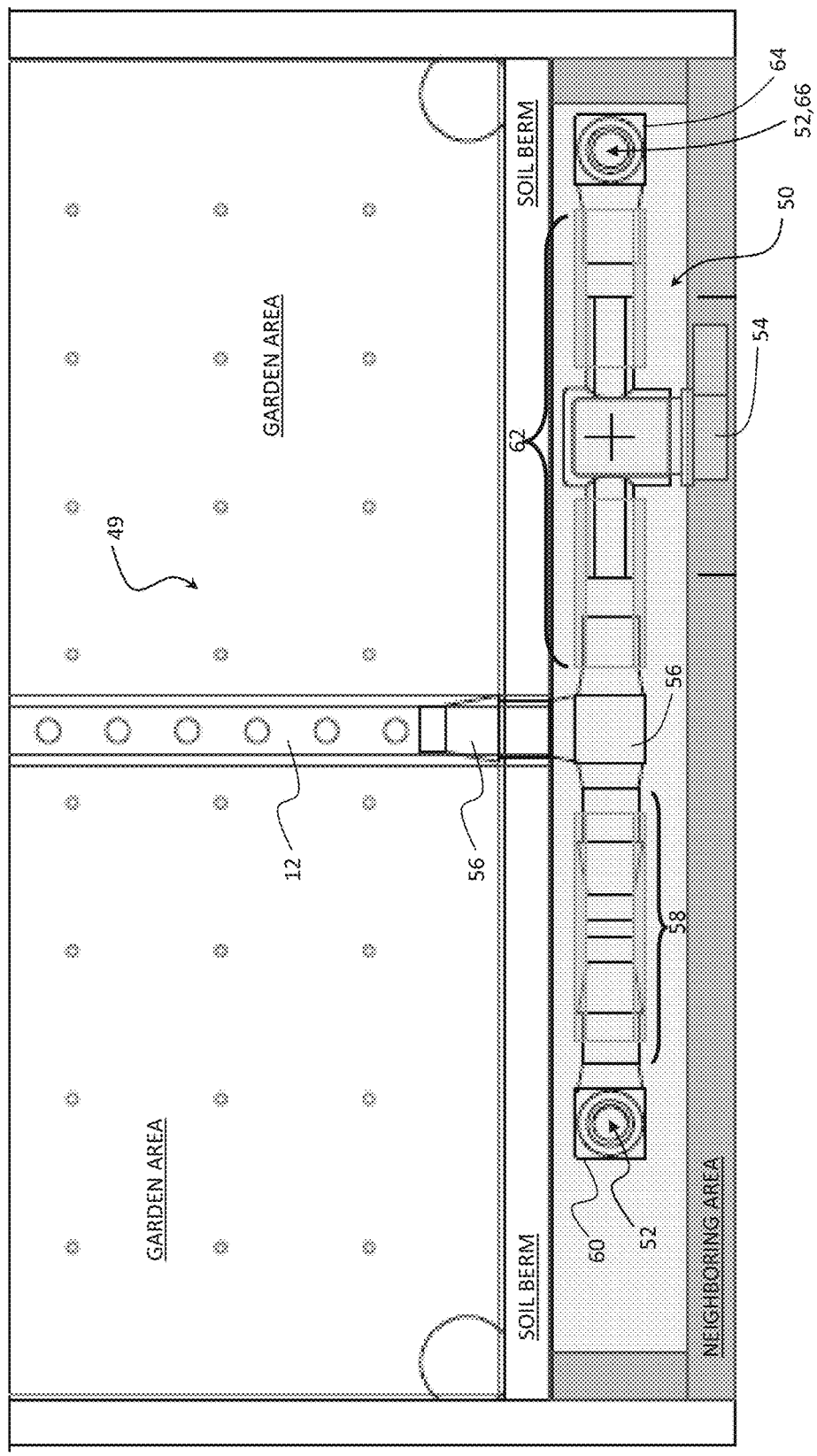
FIG. 6C is a top view of an arched overflow valve apparatus used as an overflow controller according to an embodiment of the current invention.

As seen in FIGS. 6B-6C, perforated drainage pipe 12 is connected to arched overflow valve apparatus 50 via connector fitting 56. Connector fitting 56 is coupled to piping 58 and piping 62, which are positioned substantially orthogonal to perforated draining pipe 12 along the horizontal axis underground. Piping 58, piping 62, and perforated drainage pipe 12 (via connector fitting 56) can all be disposed in open communication with each other, at least at the juncture of connector fitting 56 and piping 58, 62. Alternatively, a valve (not shown) can be positioned at that juncture in order to control the amount of water entering arched overflow valve apparatus 50 from perforated drainage pipe 12.

When valve 54 is positioned in a closed state, water is incapable of traversing through piping 62 toward end post 64. Rather, water is directed through piping 58 toward end post 60. Water is then direct upwards into arch 52, which is substantially vertically-oriented, though as discussed, can be tilted relative to perforated drainage pipe 12 in order to accommodate different root depths and determine the level of the water table. Water follows a path of travel through arch 52 just below the plant root zone until excess or overflow water traverses the apex of arch 52 and flow toward end post 64. At this point, water can flow into system drain 66, which is positioned below, to the side, or otherwise adjacent to end post 64, such that water can flow from arch 52 into system drain 66. The solid arrow, seen in FIG. 6B, from perforated drainage pipe 12 through arch 52 illustrates the path of travel of water when valve 54 is in a closed position.

Venting aperture 61 may be disposed in the apex of arch 52 to facilitate flow of water through arch 52.

When valve 54 is positioned in an open state, water is capable of traversing through piping 62 toward end post 64. Water would be directed through piping 62 and through end post 64 into system drain 66. Additionally, any additional water stored in system 49 (i.e., below the plant root zone) would be drained into system drain 66 when valve 54 is opened.

Arch 52, piping 62, and system drain 66 can be an open communication with each other at the juncture of end post 64. Alternatively, a valve (not shown) can be positioned at that juncture in order to control the amount of water entering system drain 66 from arch 52 and/or piping 62. The broken arrow, seen in FIG. 6B, from perforated drainage pipe 12 through piping 62 illustrates the path of travel of water when valve 54 is in an open position.

In FIG. 6B, it can be seen that excess overflow water has been drained but system 49 still retains water in arch 52 (i.e., just below the root zone)

System drain 66 can have a variety of outputs, for example including, but not limited to, another vegetated buffer system (such as those seen in FIGS. 1-7B) linked to system 49, an overflow garden, a storage reservoir or container, and the subsurface environment (e.g., via a conventional diffuser). System drain 66 or similar component can be utilized with T-shaped member 14 of the previous examples as well, functioning as an output of the excess water.

Example 5

Figure 7B:
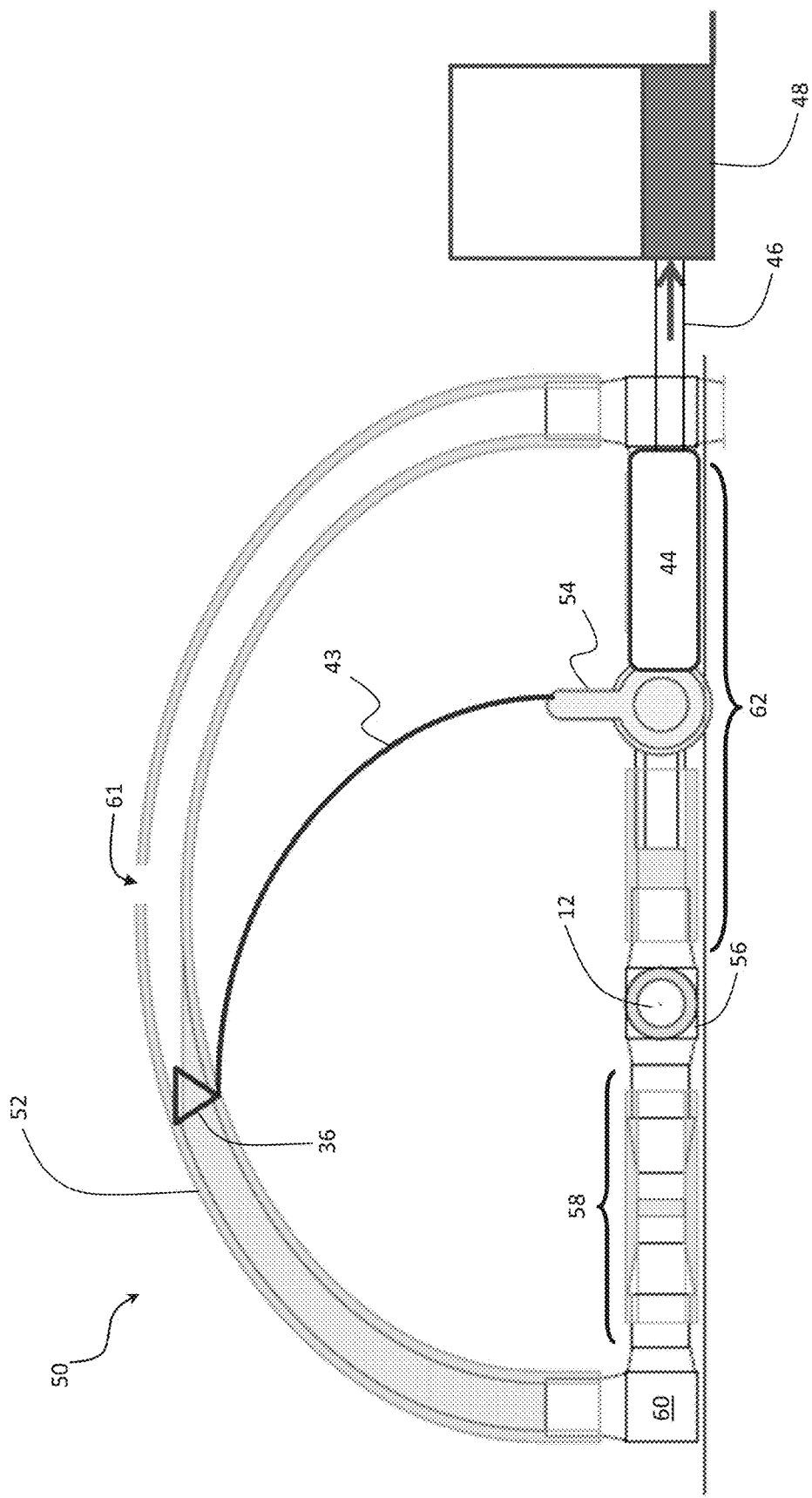
FIG. 7B is a schematic of an embodiment of a vegetated buffer system including vertical flow discharge with horizontal cleanout, where the system is used for fully automated control of a soil matrix water table (with an overflow controller being an arched overflow valve apparatus) and automated water storage.

FIG. 7A is a table showing an example of the content that may be needed to assemble an embodiment of a vegetated buffer retention system, generally denoted by the reference numeral 49, when a user desires automated control of both the soil matrix water table and stored water reuse. FIG. 7B depicts an implementation of the content in a smaller scaled (e.g., residential) rain garden. A substantially similar implementation can be achieved for larger scaled (e.g., agricultural, municipal, industrial) vegetated buffer systems as well, as will be discussed further. The height of arch 52 can be adjustable by tilting the overflow controller, generally denoted by the reference numeral 50. The apex of arch 52 thus determines the level of the water table.

System 49 is structured similar to that described in Example 4. Arched overflow valve apparatus 50 is equipped, however, in FIG. 7B with an automated system for outflow pumping into an above ground or below ground water storage reservoir 48 for subsequent reuse. Arch 52 is equipped with sensor 36 (e.g., float switch, soil moisture), and valve 54 is directly or indirectly coupled to pump 44. Sensor 36 and pump 44 are electrically connected 43 to one another.

Sensor 36 is triggered when the water height in the garden system or specifically arch 52 reaches a threshold level. Sensor 36 detects the rising level of liquid and automatically activates or energizes pump 44 to open valve 54 and pump the water from arch 52 into storage reservoir 48 for subsequent reuse (e.g., through outflow hose 46). Sensor 36 can be any suitable sensor as known in the art to detect a liquid and activate/energize a pump. Pump 44 can be any suitable pump as known in the art, for example including, but not limited to, sump pumps and condensate pumps.

Storage reservoir 48 can be positioned above ground or below ground. Storage reservoir 48 may also be equipped with an additional pump (not shown) for drip or sprinkler irrigation.

Example 6

Figure 8C:
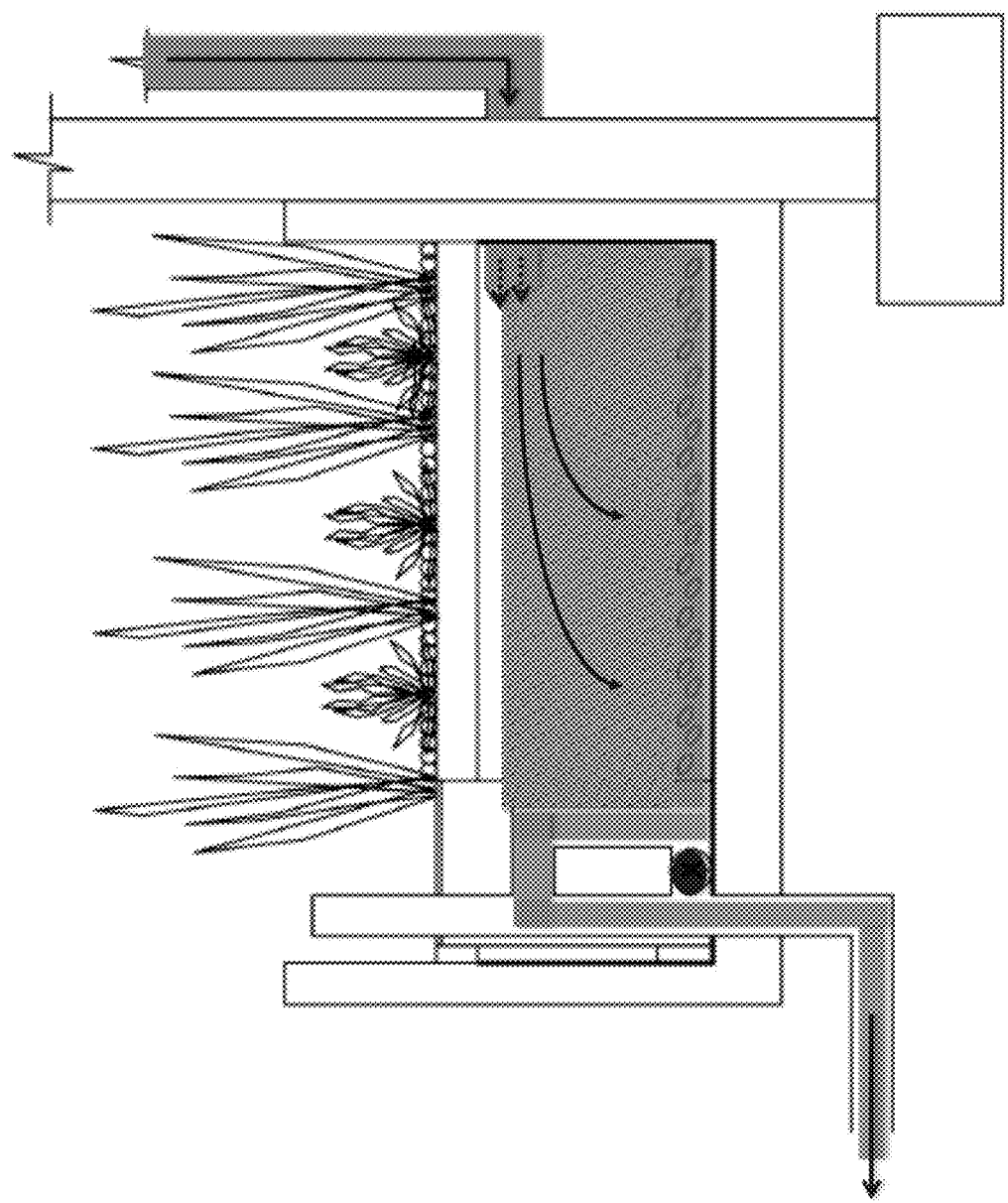
FIG. 8C depicts fluid flow through the overflow controller within the embodiment of FIG. 8A.

FIG. 8A is a cross section depicting an embodiment of a vegetated or non-vegetated buffer retention system. Here, the subgrade can be positioned adjacent to a building or other structure, or alternatively no structure at all, as the system can be disposed in the middle of a field or pocket park or even top of a roof. In any case, the subgrade is formed of the ponding area with gravel/splash block, a shallow top soil layer (depth is dependent on size of the overall system and the type of vegetation used) disposed below the ponding area, a deeper sand layer disposed beneath the top soil layer, and a shallow gravel layer disposed beneath the sand layer. The root zone of the vegetation extends between the top soil layer and the sand layer, and the main outflow pipe from the building extends into the sand layer.

As also seen in FIG. 8B, the retention system includes a perforated drainage pipe disposed in underlying relation to the sand layer, where the gravel layer surrounds the perforated pipe. In communication with the perforated pipe is an "h"-shaped overflow controller that controls the subsurface water table height, such that the water table is held just below the plant root zone. This creates both a drained aerobic zone in the upper layer of the system and also a water-saturated anaerobic zone in the bottom layer of the system. Structurally, still referring to FIG. 8B, this is accomplished by the "h"-shaped overflow controller including a vertical component and a seat. The vertical component leads to what is considered the apex of the overflow controller, and the apex sets the water table height. The seat of the overflow controller forms that apex as well, as can be seen in the figures. A venting aperture leads from a subsurface portion of the overflow controller to aboveground, in case excess water is to be outputted through that means. The "h"-shaped overflow controller further includes a base component disposed underneath the apex/seat and having a valve in communication therewith. This valve will become clearer as this specification continues.

The overflow controller is similar to the arched overflow apparatus of Examples 4 and 5 but herein can be referred to as an elevated overflow valve apparatus. It should be noted that previously-described embodiments of the current invention can also be referred to as elevated overflow valve apparatuses, as the overflow system includes a component that is elevated above a base, horizontal piping, where the apex of the elevated component sets that water table height below the plant root zone.

Figure 8D:
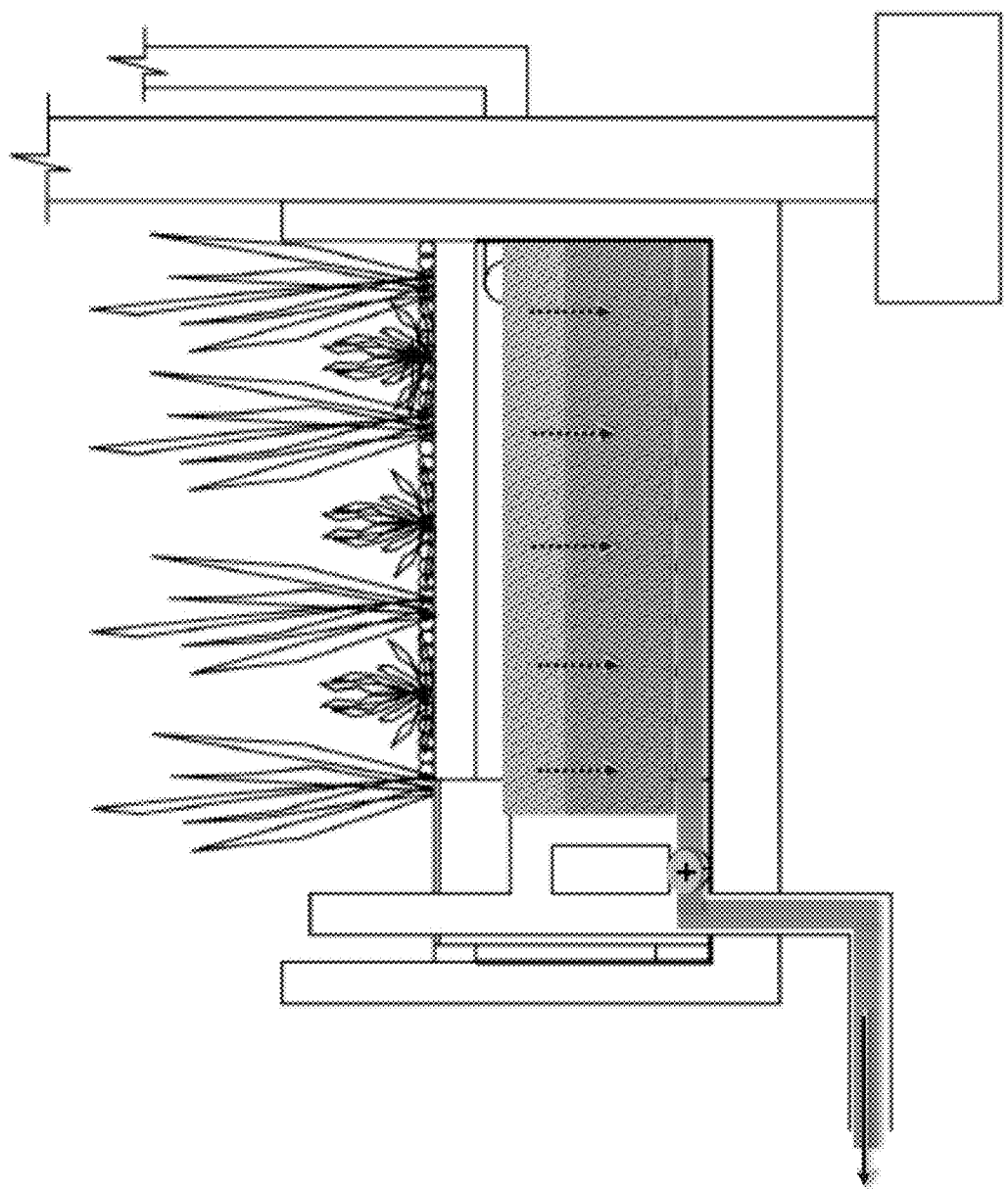
FIG. 8D depicts fluid flow bypassing the overflow controller within the embodiment of FIG. 8A.

As water enters the perforated pipe through the perforations, the water travels vertically up the vertical component of the overflow controller adjacent to the perforated pipe and travels horizontally across the seat. This is the apex of the overflow piping, i.e., where the height of the water table is set just below the root zone. When the valve in communication with that base piping is closed, water would not travel across the base piping that is coaxial with the perforated pipe and underneath the apex (see FIG. 8C). When the valve is open, water travels horizontally across the base component and out of the system drain to the main storm system, to a storage reservoir, or for exfiltration and groundwater recharge (see FIG. 8D). Optionally, a sensor (not shown in these figures) can be positioned in communication with the seat of the "h"-shaped overflow controller, similar to the disposition of the sensor in the arched overflow controller as previously discussed. Similar to the sensors previously discussed, the sensor would be in electrical communication with a pump, such that when the sensor is triggered, the pump is activated. The system drain is disposed in communication with the "h"-shaped overflow controller, such that when the pump is activated, water is pumped from the overflow controller into the system drain.

Generally, the valve controls system water storage within the soil matrix. When the valve is open, water drains to the main stormwater system, drains to a storage reservoir, or can even be exfiltrated to the groundwater after it has been held for a set period of time. When the valve is closed, the subsurface water table height is maintained below the plant root zone. If water inflow volume exceeds system storage capacity, then overflow water drains to the main stormwater system. Valve operation can be manual or automated.

The retention system may include a subsurface enclosure, such as a round box sleeve, that contains the overflow piping and protects it from external, subsurface forces. Further, the retention system may include a sealer barrier material between the overflow piping (or subsurface enclosure, if included) and an outer boundary of the bioretention area.

Figure 9A:
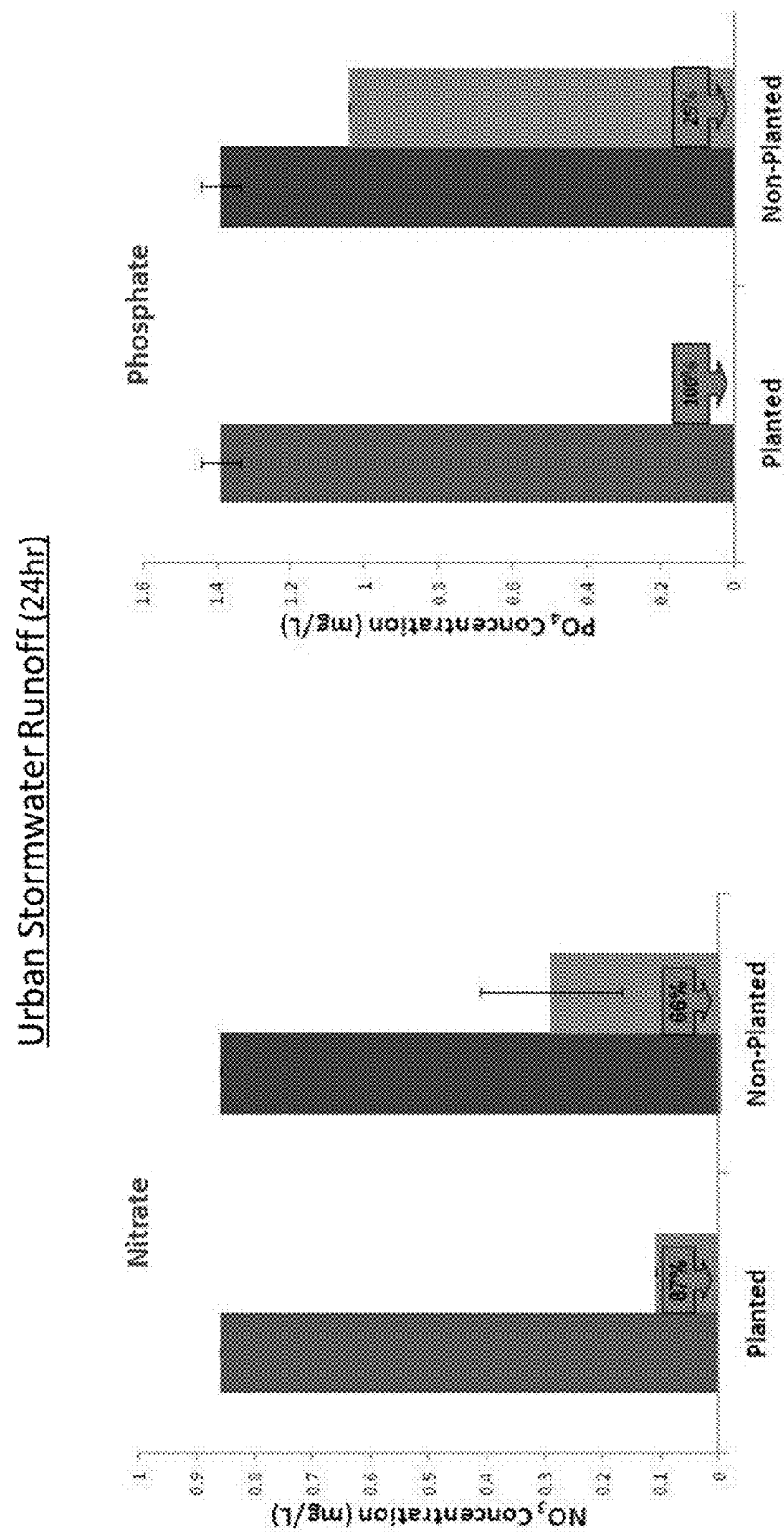
FIG. 9A is a graphical illustration depicting effects of certain embodiments of the current invention on urban stormwater runoff after 24 hours.
Figure 9B:
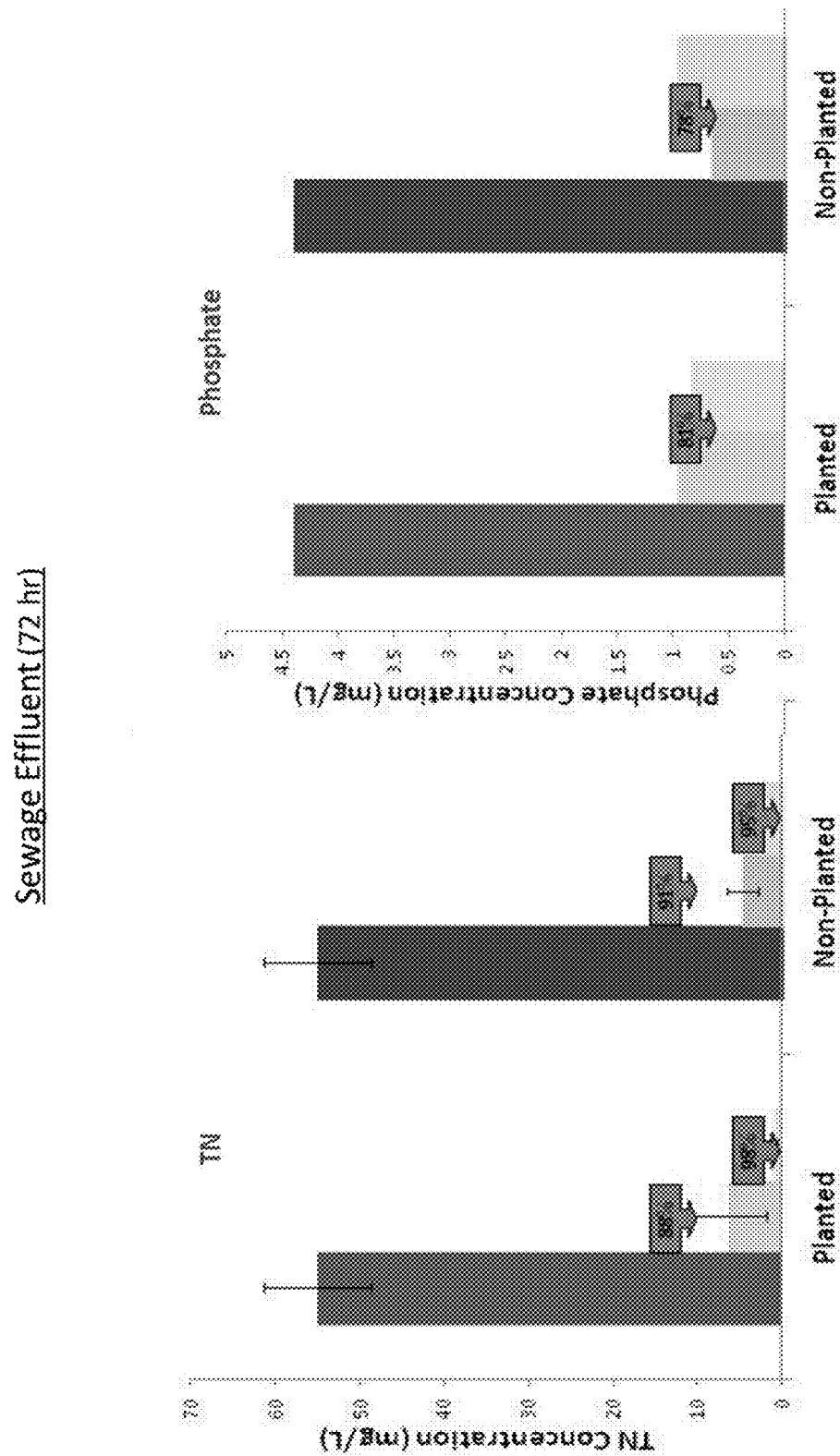
FIG. 9B is a graphical illustration depicting effects of certain embodiments of the current invention on sewage effluent after 72 hours.
Figure 9C:
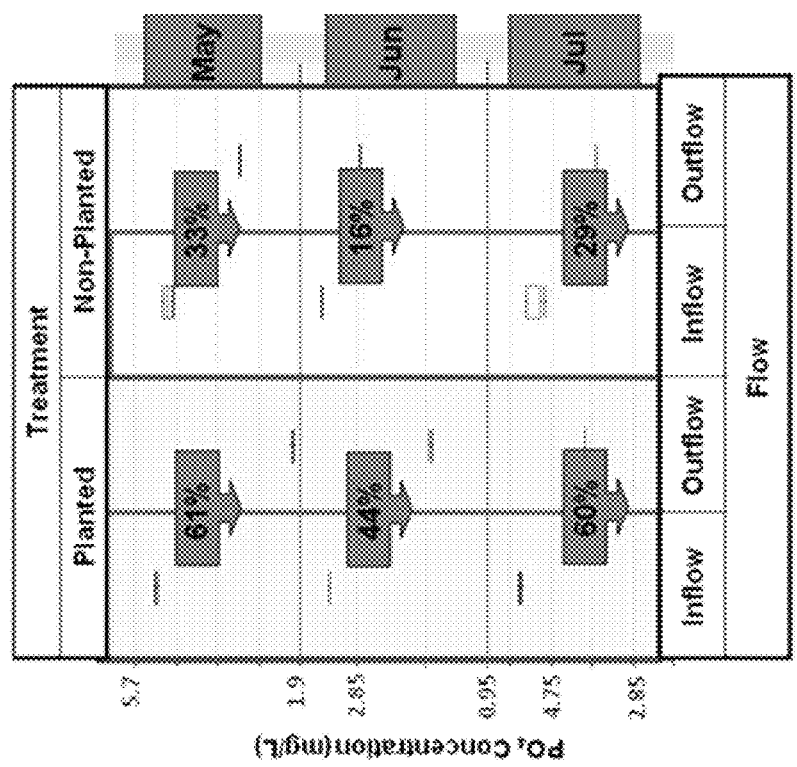
FIG. 9C is a graphical illustration depicting effects of certain embodiments of the current invention on agricultural runoff after 24 hours.
Figure 9C:
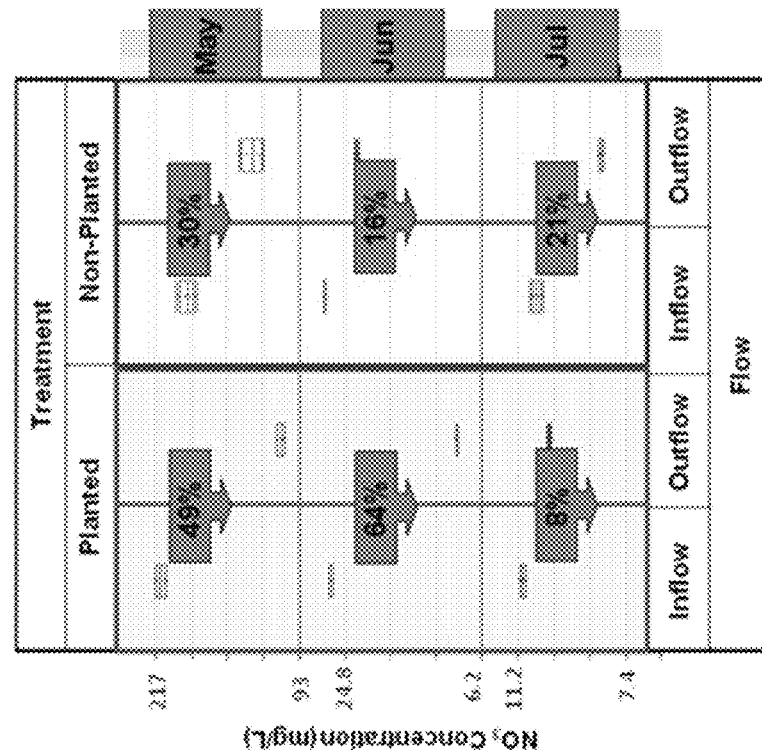

FIGS. 9A-9C depict results of a study using certain embodiments of the current invention. As can be seen, the current system had a beneficial effect on both urban stormwater runoff (FIG. 9A), sewage effluent (FIG. 9B), and agricultural runoff (FIG. 9C). Certain embodiments of the current invention showed significant nitrate and phosphate removal in urban and agricultural applications after 24 hours (FIGS. 9A & 9C, respectively). Removal of 88% nitrate and 100% phosphate was observed in urban mesocosms, and removal of 52% nitrate and 62% phosphate was observed for agricultural runoff There is 98% total nitrogen (all N species) and 81% phosphate removal in sewage effluent after 72 hours (FIG. 9B). 100% of inflow water volume is retained and ⅔ is available for storage or re-use.

Example 7

Certain embodiments of the current invention can be utilized both with smaller scaled implementations and with larger scaled implementations. Smaller scaled implementations include, for example, residential municipal or commercial sites. Larger scaled implementations include, for example, agricultural, municipal, and industrial sites. Functionally, the outflow plumbing device and water retention and reuse system would perform a substantially similar mechanism whether used in a smaller scaled setting or in a larger scaled setting. Structurally, in a larger scaled setting, the system would have larger dimensions and/or a higher quantity of substantially similar components as in the smaller scaled setting.

Glossary of Claim Terms

Arched overflow valve apparatus: This term is used herein to refer to a type of overflow controller containing an arch, a shut-off valve, and a system drain with the appropriate piping to connect the three components, such that the components are in open communication with each other when the shut-off valve is opened.

Bioretention area: This term is used herein to refer to an area of natural or established vegetation that helps protect water quality in neighboring areas.

Elevated overflow controller apparatus: This term is used herein to refer to an underground apparatus that collects/stores and/or redirects excess water from the bioretention area (via the perforated drainage pipe). Typically, the overflow controller apparatus is positioned in a subsurface that neighbors the bioretention area, but may be positioned under the bioretention area as well. Additionally, the overflow controller apparatus is "elevated" as it has a topmost portion (forming an apex of the overflow controller) raised above the perforated drainage pipe and above a base component/piping disposed therebelow, thus setting the height of the water table above the perforated drainage pipe and below the root zone.

Float switch: This term is used herein to refer to a device that detects the level of water in an enclosed structure (e.g., tank, pipe, etc.). Upon detecting a certain level of water, the float switch is triggered and automatically activates a pump for pumping said water out of the enclosed structure into another structure.

Horizontal outflow: This term is used herein to refer to a hollow piping extending from a horizontal end of a T-shaped member to facilitate flow of water in the horizontal direction away from the T-shaped member.

Liner: This term is used herein to refer to a component of a retention system where the liner is formed of a suitable material and positioned below or at the bottom of the system (beneath the piping). The liner is used to manage the subsurface volume of water.

Outflow hose: This term is used herein to refer to a hollow piping extending from an overflow controller to facilitate flow of water in any direction away from the overflow controller.

Perforated drainage pipe: This term is used herein to refer to a hollow tubing with a plurality of apertures for receiving subsurface water from a bioretention area (vegetated buffer) and redirecting that water out of the bioretention area toward a particular area that neighbors or is otherwise adjacent to the bioretention area.

Pump: This term is used herein to refer to any suitable device known in the art for moving or directing water from one component to another component. Examples include, but are not limited to, sump pumps and condensate pumps.

Sensor: This term is used herein to refer to type of converter than measures or detects a physical property and converts the detection to a signal that is read by an observer (e.g., an electronic pump). Examples of a sensor include, but are not limited to, a float switch, a timer, a soil moisture probe, and a barometric pressure sensor.

Soil matrix water table: This term is used herein to refer to a level of materials and sediment that are saturated with water in a given vicinity. For example, this can be underground as in a subsurface water table or above ground as in a green roof.

Substantially hollow: This term is used herein to refer to the interior of a component being open to fluid flow. The term "substantially" is used due to the possibility of a valve or other control mechanism being disposed within the component to block the flow of the fluid.

System drain: This term is used herein to refer to an apparatus extending from an overflow controller, where the system drain permits the flow of water out of the overflow controller.

T-shaped member: This term is used herein to refer to a type of overflow controller that has a horizontal component and a vertical component for controlling the direction of flow of water horizontally and vertically.

Valve: This term is used herein to refer to any device that regulates, directs, or otherwise controls the flow of water manually or automatically among the components of a vegetated buffer system.

Vegetated or non-vegetated buffer retention system: This term is used herein to refer to an apparatus or device utilized in a bioretention area for the purpose of slowing stormwater runoff, facilitating storage of stormwater runoff that permeates the soil, contributing to ground water recharge, and filtering sediment. The system, in turn, helps prevent soil erosion.

Vertically-oriented arch: This term is used herein to refer to a hollow component of an overflow controller that has an inverted "U"-shape and is structured to receive and store excess water until drained.

Water reservoir: This term is used herein to refer to a container or other storage structure for storing water for subsequent reuse.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A system for controlling a height of a soil matrix water table in a bioretention area, comprising:
   a perforated drainage pipe positioned underground in a substantially horizontal position beneath a root zone of the bioretention area, the perforated drainage pipe having a distal end and a proximal end; and
   an elevated overflow controller apparatus coupled directly or indirectly to the proximal end of the perforated drainage pipe, the elevated overflow controller apparatus being raised above the perforated pipe and sets the soil matrix water table at a level higher than a level of the perforated pipe, wherein the overflow controller is positioned substantially beneath the root zone or within an area adjacent to the root zone,
   the overflow controller apparatus including a vertical component that forms an apex of the overflow controller apparatus, the overflow controller apparatus further including a base component disposed beneath the vertical component and the apex of the overflow controller apparatus,
   the base component including a valve therein, the valve being a system drain such that upon the valve being open, water flows through the base component and not through the vertical component,
   wherein when the valve is in a closed position, water follows a path of travel from the perforated drainage pipe into the vertical component of the overflow controller;
   the apex of the overflow controller apparatus setting the height of the soil matrix water table upon the valve being closed and water flowing through the vertical component to the apex,
   wherein the perforated drainage pipe and the elevated overflow controller apparatus are in open communication with each other, such that water follows a path of travel from the root zone, into an interior of the perforated drainage pipe through the perforations, and into an interior of the elevated overflow controller apparatus;

the overflow controller apparatus being an h-shaped member, the h-shaped member including the vertical member and a seat, wherein the seat forms the apex of the overflow controller apparatus;

a venting pipe disposed on or extending from the apex of the overflow controller apparatus;

a sensor equipped on the seat of the h-shaped member;

a pump in electrical communication with the sensor, such that when the sensor is triggered, the pump is activated;

an outflow hose in communication with the h-shaped member, such that when the pump is activated, water is pumped by the pump from the h-shaped member into the outflow hose.

2. The system of claim 1, further comprising:

the overflow controller apparatus indirectly coupled to the perforated drainage pipe;

a solid drainage pipe secured to the proximal end of the perforated drainage pipe, the overflow controller apparatus coupled to a proximal end of the solid drainage pipe, such that the respective interiors of the perforated drainage pipe, the solid drainage pipe, and the overflow controller apparatus are in open communication with each other.

3. The system of claim 1, further comprising:

a liner disposed in underlying relation to the perforated drainage pipe.

4. The system of claim 1, further comprising a water reservoir coupled to the outflow hose for storing the water that is pumped through the outflow hose.

5. The system of claim 1, further comprising:

the sensor being a float switch.

6. The system of claim 1, further comprising:

a subsurface enclosure that encloses the overflow controller apparatus.

7. The system of claim 6, wherein the subsurface enclosure is a round box sleeve.

8. The system of claim 1, further comprising:

a sensor equipped on the vertical component and in communication with the valve for automatically opening and closing of the valve, wherein triggering the sensor opens the valve for water to exit the overflow controller apparatus through the base component.

9. The system of claim 8, further comprising:

a water reservoir coupled to the base component for storing water that flows through the base component.

10. The system of claim 8, further comprising:

the sensor being a float switch.

\* \* \* \* \*